United States Patent [19]

Bushnell et al.

[11] Patent Number: 5,048,404
[45] Date of Patent: Sep. 17, 1991

[54] HIGH PULSED VOLTAGE SYSTEMS FOR EXTENDING THE SHELF LIFE OF PUMPABLE FOOD PRODUCTS

[75] Inventors: Andrew H. Bushnell, San Diego; Joseph E. Dunn, Rancho La Costa; R. Wayne Clark, Del Mar, all of Calif.

[73] Assignee: Foodco Corporation, San Diego, Calif.

[21] Appl. No.: 609,080

[22] Filed: Nov. 2, 1990

Related U.S. Application Data

[60] Continuation of Ser. No. 527,656, May 16, 1990, abandoned, which is a continuation of Ser. No. 365,082, Jun. 12, 1984, abandoned, which is a continuation-in-part of Ser. No. 51,841, May 18, 1987, Pat. No. 4,838,154, which is a division of Ser. No. 740,004, May 31, 1985, Pat. No. 4,695,472.

[51] Int. Cl.$^5$ ............................................. A23L 3/32
[52] U.S. Cl. ..................................... 99/451; 99/483; 99/DIG. 14
[58] Field of Search .............. 99/451, 483, 516, 536; 422/22, 23; 426/237, 238, 521; 219/291, 295, 288

[56] References Cited

U.S. PATENT DOCUMENTS

| | | |
|---|---|---|
| 930,023 | 8/1909 | Bartley . |
| 1,044,201 | 11/1912 | Lincoln . |
| 1,063,170 | 5/1913 | Lincoln . |
| 1,162,213 | 11/1915 | Bloom . |
| 1,360,447 | 11/1920 | Rudd . |
| 1,863,222 | 6/1932 | Hoermann . |
| 1,934,703 | 11/1933 | Golden . |
| 1,934,704 | 11/1933 | Golden . |
| 2,081,243 | 9/1933 | Macy . |
| 2,084,004 | 6/1937 | Riccioni . |
| 2,132,708 | 10/1938 | Smith . |
| 2,576,862 | 11/1951 | Smith et al. . |
| 2,637,408 | 5/1953 | Yadoff . |
| 2,845,660 | 10/1957 | Robertson . |
| 3,095,359 | 6/1963 | Heller . |
| 3,265,605 | 8/1966 | Doevenspeck . |
| 3,272,636 | 9/1966 | Fehr et al. . |
| 3,383,163 | 5/1968 | Menashi . |
| 3,445,568 | 5/1969 | Allen . |
| 3,594,115 | 7/1971 | Wesley . |
| 3,876,373 | 4/1975 | Glyptis . |
| 3,881,405 | 5/1975 | Morando . |
| 4,188,375 | 2/1980 | Straub . |
| 4,434,357 | 2/1984 | Simpson et al. . |
| 4,457,221 | 7/1984 | Geren . |
| 4,522,834 | 6/1985 | Miyahara . |
| 4,524,079 | 6/1985 | Hofmann . |
| 4,572,775 | 2/1986 | Paniagua . |
| 4,608,920 | 9/1986 | Scheglov et al. . |
| 4,612,199 | 9/1986 | Miyahara . |
| 4,695,472 | 9/1987 | Dunn et al. . |
| 4,838,154 | 6/1989 | Dunn et al. . |

FOREIGN PATENT DOCUMENTS

| | | |
|---|---|---|
| 516657 | 6/1981 | Australia . |
| 832390 | 1/1970 | Canada . |
| 3233282 | 3/1984 | Fed. Rep. of Germany . |
| 2513087 | 3/1983 | France . |
| 6811635 | 2/1970 | Netherlands . |
| 706443 | 12/1979 | U.S.S.R. . |
| 1055463 | 11/1983 | U.S.S.R. . |

(List continued on next page.)

OTHER PUBLICATIONS

Gupta, R. and Murray, W., "Pulsed High Electric Field Sterilization", National Research Council, Ottawa, Canada, K1A 0R6, date unknown.

(List continued on next page.)

*Primary Examiner*—Timothy F. Simone
*Attorney, Agent, or Firm*—Fitch, Even, Tabin & Flannery

[57] ABSTRACT

The present invention is directed to methods and apparatus for preserving fluid foodstuffs, and more particularly is directed to such methods and apparatus for extending the shelf life of perishable fluid foodstuffs such as dairy products, fruit juices and liquid egg products, which are growth media for microorganisms. The present invention is also directed to preserved liquid foodstuffs which have extended shelf life.

4 Claims, 10 Drawing Sheets

FOREIGN PATENT DOCUMENTS

| | | |
|---|---|---|
| 390131 | 6/1931 | United Kingdom . |
| 671922 | 5/1952 | United Kingdom . |
| 1354359 | 5/1974 | United Kingdom . |
| 2068199 | 8/1981 | United Kingdom . |
| 2098453 | 11/1982 | United Kingdom . |
| 2100590 | 1/1983 | United Kingdom . |

OTHER PUBLICATIONS

Brandt, B., Edebo, L., Hedén, C., Hjortzberg-Nordlund, B., Selin, I. and Tigerschiöld, M., The Effect of Submerged Electrical Discharges on Bacteria:, TVF 33 (1962), 5, 222–229.

Sale, A. and Hamilton, W., "Effects of High Electric Fields on Micro-Organisms: I. Killing of Bacteria and Yeasts", Biochim, Biophys. Acta 148 (1967), pp. 781–788.

Sale, A. and Hamilton W., "Effects of High Electric Fields on Micro-Organisms: III. Lysis of Erythrocytes and Protoplasts", Biochim. Biophys. Acta 163 (1968), pp. 37–43.

Hülsheger, H. and Niemann, E., "Lethal Effects of High-Voltage Pulses on E. Coli K12", Radiat. Environ. Biophys. 18:281–288 (1980).

Hülsheger et al., "Killing of Bacteria with Electric Pulses of High Field Strength", Radiat. Environ. Biophys. 20:53–65 (1981).

Hülsheger, H., Potel, J. and Niemann, E., "Electric Field Effects on Bacteria and Yeast Cells", Radiat. Environ. Biophys. 22: 149–162 (1983).

Jacob, H., Förster, W. and Berg, H., "Microbiological Implications of Electric Field Effects: II. Inactivation of Yeast Cells and Repair of their Cell Envelope", Zeitschrift für Allgemeine Mikrobiologie 21, 3 (1981), pp. 225–233.

Zimmerman, U. and Scheurich, P., "High Frequency Fusion of Plant Protoplasts by Electric Fields", Planta 151:26–32 (1981).

Schwan, H., "Field Interaction with Biological Matter", Annals New York Academy of Sciences, 198–213, date unknown.

Zimmerman, U., Schulz, J. and Pilwat, G., "Transcellular Ion Flow in Escherichia Coli B and Electrical Sizing of Bacterias", Biophysical Journal, vol. 13 (1973), 1005–1013.

Kinosita, K. and Tsong, T., "Voltage-Induced Pore Formation and Hemolysis of Human Erythrocytes", Biochim. Biophys. Acta 471:227–242 (1977).

Kinosita, K. and Tsong, T., "Formation and Resealing of Pores of Controlled Sizes in Human Erythrocyte Membrane", Nature, vol. 268, Aug. 4, 1977, pp. 438–440.

Vienken, J., Jeltsch, E. and Zimmerman, U., "Penetration and Entrapment of Large Particles in Erythrocytes by Electrical Breakdown Techniques", Cytobiologie 17, 182–196 (1978).

Zimmerman, U. and Vienken, J., "Electric Field-Induced Cell-to-Cell Fusion", Journal Membrane Biol., 67, pp. 165–182 (1982).

Zimmerman, U., Vienken, J., & Pilwat, G., "Development of Drug Carrier Systems: Electrical Field Induced Effects in Cell Membranes", Bioelectrochemistry and Bioenergetics, 7, pp. 553–574 (1980).

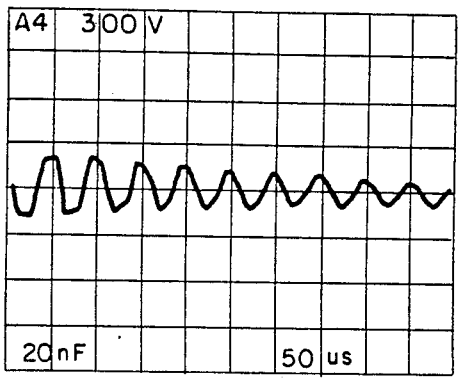
FIG. 7 SHORT CIRCUITED PFN WAVEFORM
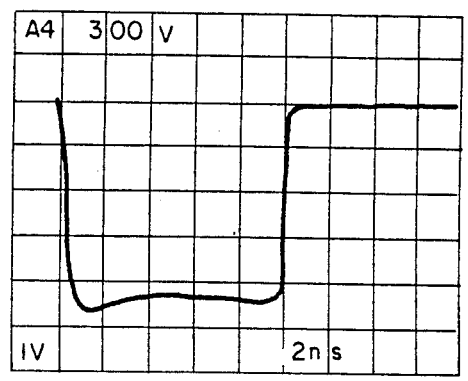
(a)
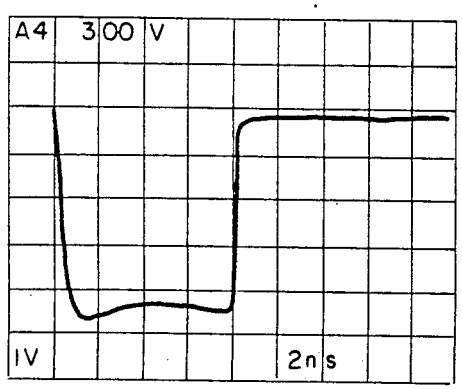
(b)
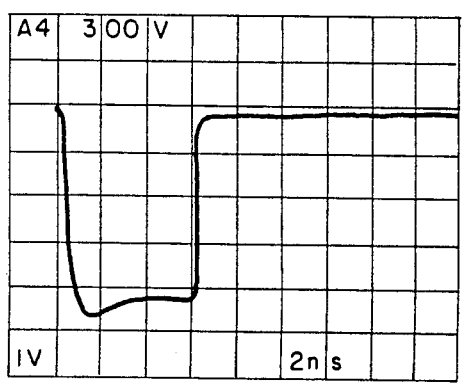
(c)
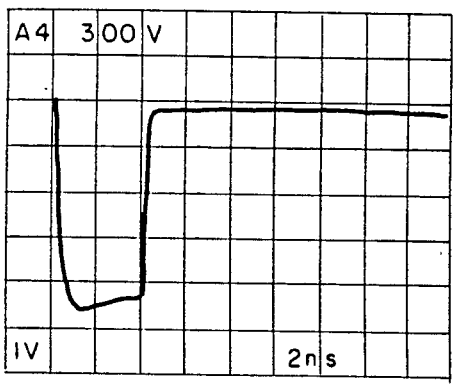
(d)
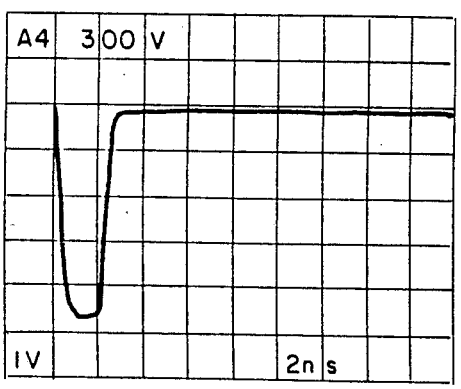
(e)
FIG. 8  20Ω LOAD OUTPUT VOLTAGE WAVEFORMS

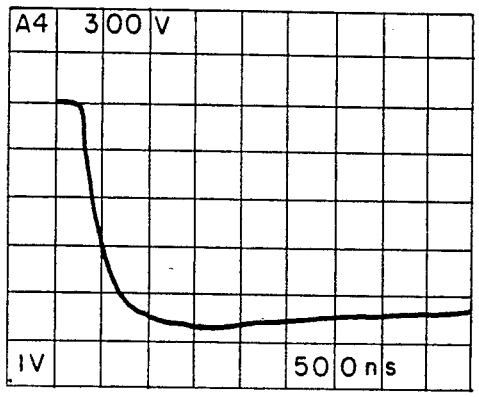
FIG. 9 TYPICAL PFN RISE TIME FOR A 20Ω LOAD
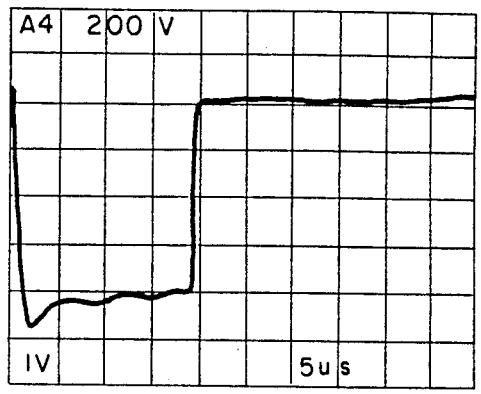
FIG. 10 ONE Ω-CM SALT SOLUTION APPLIED VOLTAGE WAVEFORM
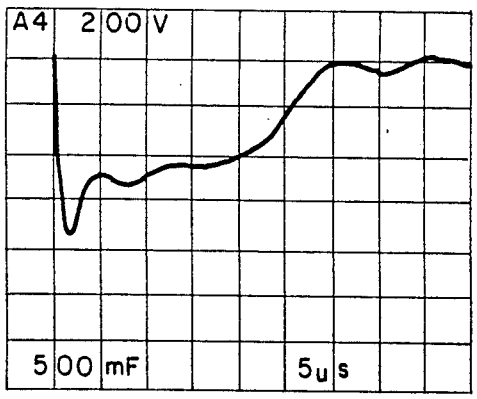
FIG. 11 300 Ω SALT SOLUTION APPLIED VOLTAGE WAVEFORM
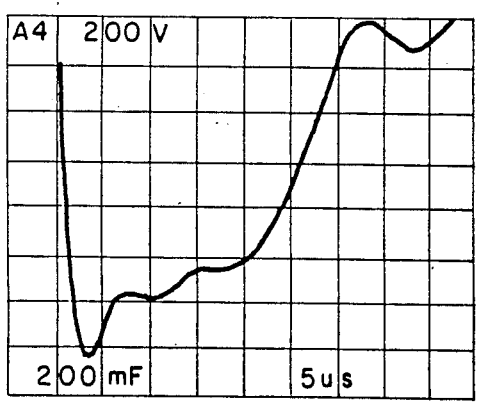
FIG. 12 APPLE JUICE - APPLIED VOLTAGE WAVEFORM
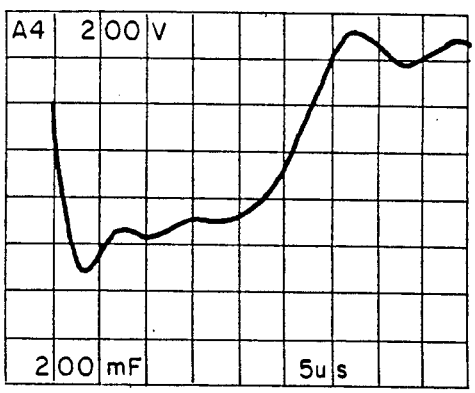
FIG. 13 MILK - APPLIED VOLTAGE WAVEFORM
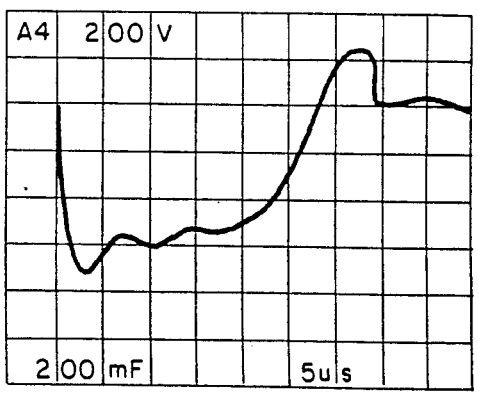
FIG. 14 UNFILTERED ORANGE JUICE - APPLIED VOLTAGE WAVEFORM

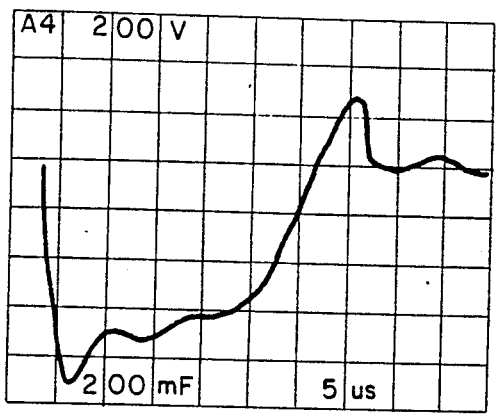
FIG. 15 FILTERED ORANGE JUICE-APPLIED VOLTAGE WAVEFORM
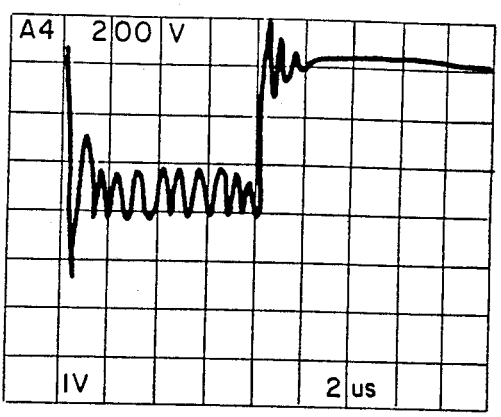
FIG. 16 DEIONIZED WATER-APPLIED VOLTAGE WAVEFORM
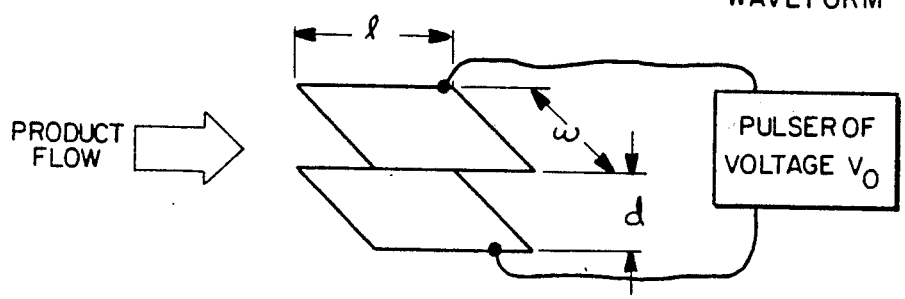
FIG. 17
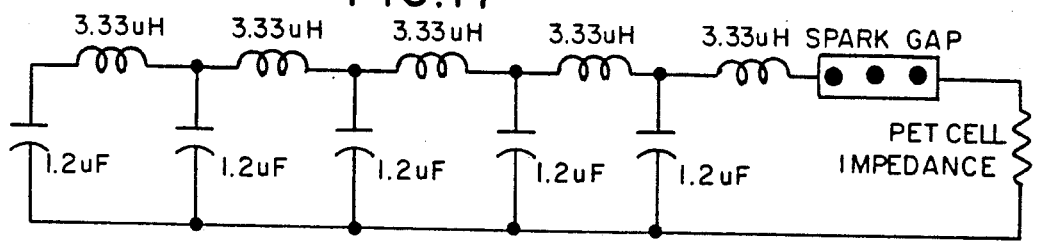
FIG. 18
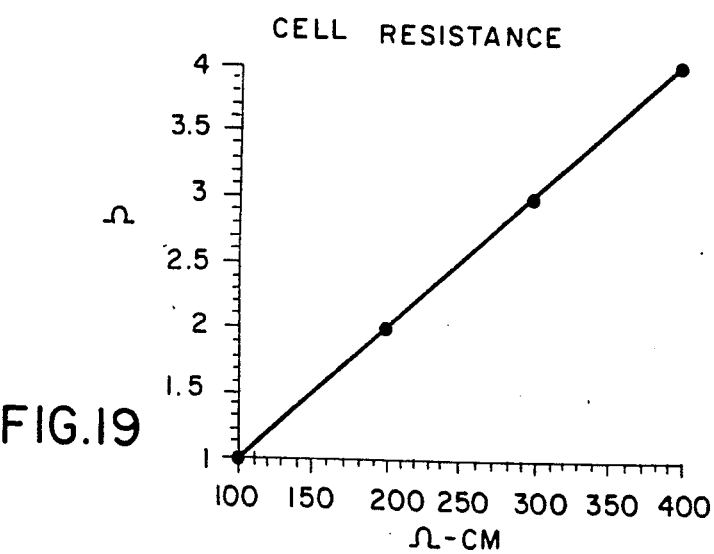
FIG. 19

HIGH PULSED VOLTAGE SYSTEMS FOR EXTENDING THE SHELF LIFE OF PUMPABLE FOOD PRODUCTS

This application is a continuation of application Ser. No. 527,656 filed May 16, 1990, now abandoned, which is a continuation of application Ser. No. 07/365,082 filed June 12, 1989, abandoned which is a continuation-in-part of application Ser. No. 051,841 filed May 18, 1987, U.S. Pat. No. 4,838,154 which is a divisional of application Ser. No. 740,004, filed May 31, 1985, now U.S. Pat. No. 4,695,472.

BACKGROUND OF THE INVENTION

The present invention is directed to methods and apparatus for preserving fluid foodstuffs, and more particularly is directed to such methods and apparatus for extending the shelf life of perishable fluid foodstuffs such as dairy products, fruit juices and liquid egg products, which are growth media for microorganisms. The present invention is also directed to preserved liquid foodstuffs which have extended shelf life.

Substantial technical effort has been directed to the preservation of perishable fluid food products such as milk products, natural fruit juices and liquid egg products which may normally contain a wide variety of microorganisms, and which are excellent culture media for microorganisms.

Practical preservation methods which have found significant commercial application predominantly utilize heat treatment such as pasteurization to inactivate or reduce the microorganism population. For example, milk products are conventionally pasteurized at a minimum temperature of at least about 72° C. for 15 seconds (or equivalent time/temperature relationship) to destroy pathogenic bacteria and most of the nonpathogenic organisms, with degradative enzyme systems also being partial or totally inactivated. However, products processed in this manner are still generally nonsterile and have limited shelf life, even at refrigeration temperature. The shelf life of liquid foodstuffs may be substantially extended by higher heat treatment processes such as "ultra high pasteurization", or "ultra high temperature"("UHT") such as treatment of from about 94° C. for 3 seconds to about 150° C. for one second in conjunction with aseptic packaging to achieve complete destruction of all bacteria and spores. However, such heat treatment typically adversely affects the flavor of the food product, at least partially denatures its protein content or otherwise adversely affects desired properties of the fluid food product. Other approaches to liquid food preservation, which also have certain disadvantages, include the use of chemical additives or ionizing radiation.

The bactericidal effects of electric currents have also been investigated since the end of the 19th century, with various efforts having been made to utilize electrical currents for treating food products, such as described in U.S. Pat. Nos. 1,900,509, 2,428,328, 2,428,329 and 4,457,221 and German Patents 1,946,267 and 2,907,887. The lethal effects of low-frequency alternating current with low electric field strength have been largely attributed to the formation of electrolytic chemical products from the application of current through direct contact electrodes, as well as ohmic heating produced by current flow through an electrically resistive medium. As described in U.S. Pat. No. 3,594,115, lethal effects of high voltage arc discharges have also been attributed to electrohydraulic shock waves. However, such electrolytic chemical products may be undesirable in fluid foodstuffs, and the utilization of explosive arc discharges to produce microbiologically lethal shock waves has not found wide-spread application in the provision of edible liquid foodstuffs having extended shelf life.

More recently, separately from the art of food preservation, the effect of strong electric fields on microorganisms in nonnutrient media has been studied as a mechanism for reversibly or irreversibly increasing the permeability of the cell membrane of microorganisms and individual cells [Sale, et al., "Effects of High Electric Fields on Mi Lysis of Erythrocytes and Protoplasts", Biochimica et Biophysica Acta, 163, pp. 37–43 (1968); Hulsheger, et al., "Killing of Bacteria with Electric Pulses of High Field Strength", Radiat. Environ. Biophys; 20, pp. 53–65 (1981); Hulsheger, et al., "Lethal Effects of High-Voltage Pulses on E. coli K12", Radiat. Environ. Biophys. 18, pp. 281–288 (1980); Zimmermann, et al., "Effects of External Electrical Fields on Cell Membranes", Bioelectrochemistry and Bioenergetics, 3, pp. 58–63 (1976); Zimmermann, et al., "Electric Field-Induced Cell-to-Cell Fusion", J. Membrane Biol., 67, pp. 165-182 (1982); Hulsheger, et al; "Electric Field Effects on Bacteria and Yeast Cells", Radiat. Environ. Biophys; 22, pp. 149-162 (1983); U. Zimmermann, et al., "The Development of Drug Carrier Systems: Electrical Field Induced Effects in Cell Membranes", Biochemistry and Bioenergetics, 7, pp. 553-574 (1980); Jacob, et al., "Microbiological Implications of Electric Field Effects II. Inactivation of Yeast Cells and Repair of Their Cell Envelope", Zeitschrift fur Allgemeine Mikrobiologic, 21, 3, pp. 225-233 (1981); Kinositas, Jr., "Formation and Resealing of Pores of Controlled Sizes in Human Erythrocyte Membrane", Nature, 268, 4, pp. 438-440 (Aug., 1977); Neamann, et al., "Gene Transfer into Mouse Lyoma Cells by Electroporation in High Electric Fields", IRI Press Limited, Oxford, England, pp. 841-845]. The application of high electric fields to reversibly increase the permeability of cells has been used to carry out cell fusion of living cells and to introduce normally excluded components into living cells. Electric fields in nonnutrient media have a direct lethal effect upon microorganisms with the rate of kill dependent upon the field strength above a critical field level and the duration of the applied high voltage pulse or pulses.

These studies postulate the cell membrane as the site of a critical effect, of reversible or irreversible loss of membrane function as the semipermeable barrier between the cell and its environment. An external field of short duration is assumed to induce an imposed transmembrane potential above a critical electric field value, which may produce a dramatic increase of membrane permeability. Because an increase in cell permeability prevents the counteracting of differences in osmolality of the cell content and surrounding media, exchange or loss of cell contents, cell lysis and irreversible destruction may occur as secondary mechanisms in nonnutrient media which limit the ability of cells to repair themselves, and which adversely affect permeable cells through osmotic pressure differences between the medium and the interior of the cell.

U.S. Pat. No. 4,838,175 and U.S. Pat. No. 4,695,472 identified hereinabove, are directed to methods and apparatus for providing fluid food products having extended shelf life. However, improved methods and apparatus of this type would be desirable, particularly such methods and apparatus having improved performance and efficiency. Accordingly, it is an object of the present invention to provide methods and apparatus for extending the shelf life of perishable pumpable food products such as dairy products, natural fruit juices, pumpable fluid egg products, beer, wine, soups, stews, gravies, particulate food suspensions or slurries and other pumpable food products. These and other objects of the present invention will become apparent from the following detailed description and the accompanying drawings.

DESCRIPTION OF THE DRAWINGS

FIG. 7 is an oscilloscope trace of the pulse forming network of FIG. 6 operating in a short circuited load;

FIGS. 8a, 8b, 8c, 8d, ie is an oscilloscope trace illustrating the typical pulse forming network rise time for a 20 ohm load for the network of FIG. 6;

FIG. 9 is an oscilloscope trace of the rise time of the pulse forming network with a 20 ohm load;

FIG. 10 is a voltage vs. time oscilloscope trace of the output of the network of FIG. 6 applied to a one ohm-cm salt solution;

FIG. 11 is a voltage vs. time oscilloscope trace of the output of the network of FIG. 6 applied to a 300 ohm-cm salt solution;

FIG. 12 is a voltage vs. time oscilloscope trace of the output of the network of FIG. 6 applied to apple Juice;

FIG. 13 is a voltage vs. time oscilloscope trace of the output of the network of FIG. 6 applied to milk;

FIG. 14 is a voltage vs. time oscilloscope trace of the output of the network of FIG. 6 applied to unfiltered orange juice;

FIG. 15 is a voltage vs. time oscilloscope trace of the output of the network of FIG. 6 applied to filtered orange juice;

FIG. 16 is a voltage vs. time oscilloscope trace of the output of the network of FIG. 6 applied to deionized water;

FIG. 17 is a schematic diagram of a pulsed electric field configuration for defining design analysis;

FIG. 18 is a schematic diagram of a continuous pulser system showing the pulse forming network;

FIG. 19 is a graphic representation of the resistance of a pulsed electric field cell as a function of product resistivity;

DESCRIPTION OF THE INVENTION

Figure 1:
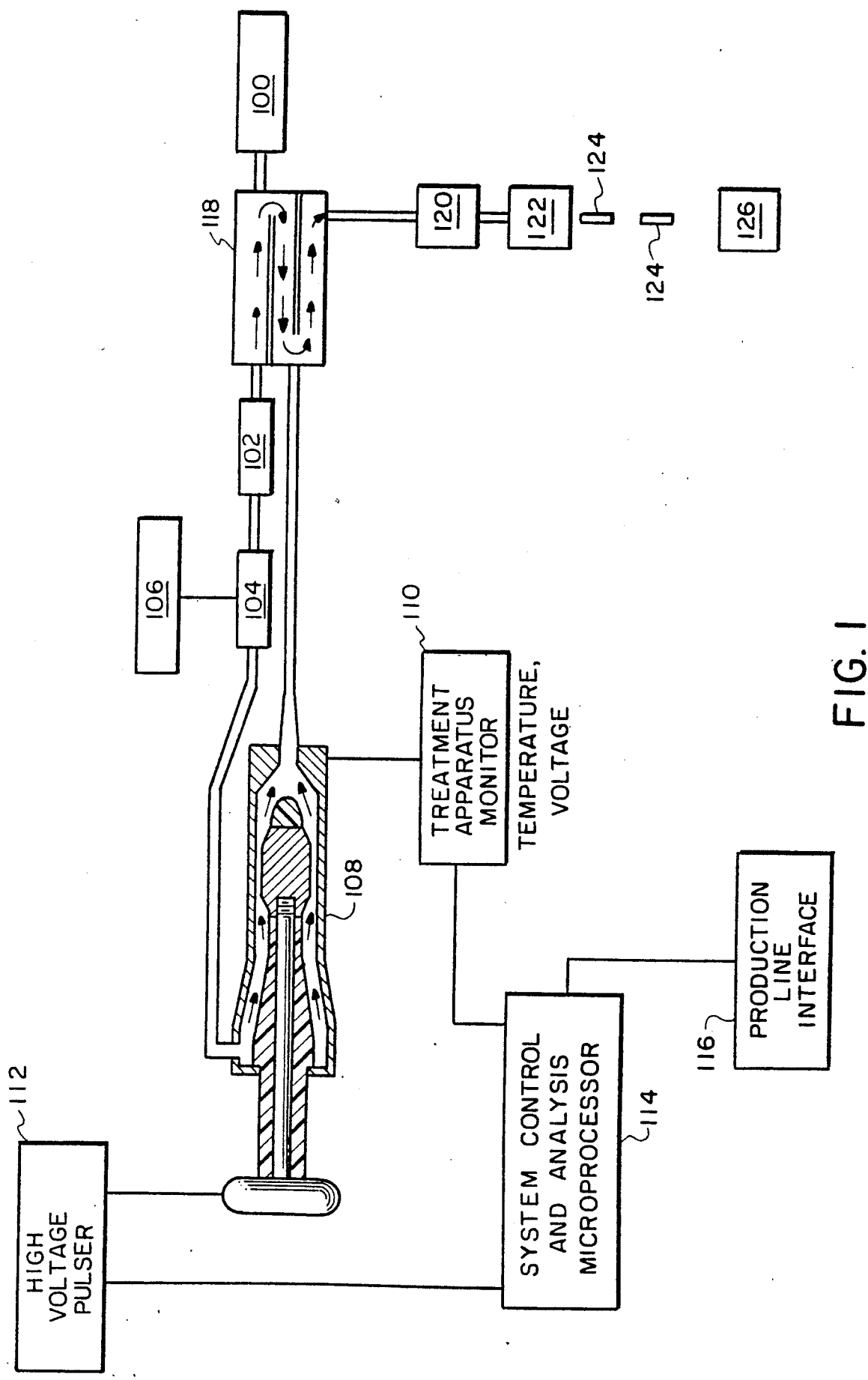
FIG. 1 is a schematic illustration of an embodiment of a continuous product flow processing system for extending the shelf life of perishable pumpable foodstuffs utilizing a treatment system capable of applying very high electric field stress to a pumpable food product in accordance with the present invention.

Generally in accordance with the present invention, methods and apparatus are provided for preserving fluid foodstuffs which are normally excellent bacteriological growth media, by applying very high voltage electrical field pulses of very short duration through all of the foodstuff. By "pumpable foodstuff" is meant an edible, food product having a viscosity or extrusion capacity such that the food product may be forced to flow through a treatment zone. The products include extrudable products, such as doughs or meat emulsions, fluid products such as beverages, fluid dairy products, gravies, sauces and soups, and food-particulate containing food slurries such as stews, and food-particulate containing soups, and cooked or uncooked vegetable or grain slurries. Desirably, the liquid phase of product will have a viscosity of less than about 1000 poise, and preferably less than about 500 centipoise, at a temperature above 0° C. Typically, the pumpable food products may comprise in the range of from about 20 to about 95 percent by weight water, and from about 4 to about 75 percent by weight of solids selected from the group consisting of proteins, carbohydrates and fats, and mixtures thereof, based on the total weight of the foodstuff. The viscosity of the foodstuff may generally best be determined at ambient temperature (e.g., about 23° C.) or an elevated processing temperature (e.g., 65° C.). By "bacteriological growth medium" is meant that upon storage at a temperature in the range of 10° C. to about 30° C., the fluid foodstuff, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight or other qualitative or quantitative analytical methodology for monitoring increase in biological activity or content. For example, under such conditions the microbiological population of a pumpable foodstuff which is a bacteriological growth medium may at least double over a time period of two days. The fluid foodstuffs will have an electrical conductivity of at least about 0.0001 mhos cm$^{-1}$, although deionized food products may also be treated which have lower conductivities. Typically, pumpable food products may have a combined sodium and potassium content of at least about 0.10 weight percent, based on the total weight of the fluid foodstuff. It is noted that deionized water may be used as a slurrying agent for the high pulsed electric field treatment of particulate cooked, hydrated, uncooked or unhydrated food products, as will be described in more detail hereinafter. The compositions of typical fluid food products which are biological growth media, derived from "Nutritive Value of American Foods in Common Units", Agriculture Handbook No. 456 of the U.S. Department of Agriculture (1975), are as follows:

tric fields is another aspect of the present methods and apparatus which will be discussed in more detail hereinafter.

As indicated, in accordance with the present invention, all of the pumpable fluid foodstuff is subjected to at least one very high field and current intensity electric pulse, and at least a portion of the fluid foodstuff may desirably be subjected to a plurality of very high voltage electric pulses in a high stability electric pulse treatment zone. The pumpable food product may be subjected to such very high voltage short duration pulses by a variety of processing techniques. In one such processing method, the liquid foodstuff is introduced into a treatment zone between two electrodes which have a configuration adapted to produce a substantially uniform electric field therebetween without dielectric tracking or other breakdown. Very high voltage electric pulses may be applied to the electrodes to subject the liquid foodstuff to the multiple pulse treatment by pulsed field apparatus such as lumped transmission line circuits, Blumlein transmission circuits and/or capacitive discharge circuits. Field reversal techniques may also be utilized by capacitive discharge systems and pulse forming networks to increase the effective potential across the cell. Thus, by applying a short pulse of, for example, 20 kilovolts per centimeter across a treatment cell for a short period of time (e.g., 2 microseconds) of one polarity, followed by abrupt reversal of the

| Fluid Food Product | FLUID FOODSTUFFS | | | | | |
|---|---|---|---|---|---|---|
| | Water Wt % | Protein Wt % | Fat Wt % | Carbohydrate Wt % | Na Wt % | K Wt % |
| Whole Milk (3.5% fat) | 87.4 | 3.48 | 3.48 | 4.91 | .05 | .144 |
| Yogurt** | 89.0 | 3.40 | 1.68 | 5.22 | .050 | .142 |
| Raw Orange Juice | 88.3 | .685 | .20 | 10.0 | .0008 | .2 |
| Grape Juice | 82.9 | .001 | trace | .166 | .0019 | .115 |
| Raw Lemon Juice | 91.0 | .41 | .20 | 8.0 | .0008 | .14 |
| Raw Grapefruit Juice | 90.0 | .48 | .08 | 9.18 | .0008 | .16 |
| Apple Juice | 87.8 | .08 | trace | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split Pea Soup* | 70.7 | 6.99 | 2.60 | 16.99 | .77 | .22 |
| Tomato Soup* | 81.0 | 1.60 | 2.10 | 12.69 | .79 | .187 |
| Tomato Catsup | 68.6 | 2.0 | .588 | 25.4 | 1.04 | .362 |
| Vegetable beef soup | 91.9 | 2.08 | .898 | 3.9 | .427 | .066 |

*condensed - commercial
**from partially skimmed milk

The present invention is directed to methods and apparatus for preservation treatment of pumpable food products which may utilize extremely high electric field pulses of short, controlled pulse durations. Such fields may be applied by means of treatment cells of high field stability design which will be described in detail herein. Various embodiments of such methods and apparatus may use electric field processing to both preserve and heat for the combined benefit of electric field treatment at slightly elevated temperature. Single pulse treatment may be employed for various food products. Processible foodstuffs include low viscosity products such as beverages, as well as thick, viscous, particulate and mixed liquid-particulate edibles. The use of de-gassing methods and apparatus to facilitate the use of high elecapplied potential within a short time period (e.g., 2 microseconds), an effective field approaching 40 kilovolts per centimeter may be developed across the cell. If the liquid foodstuff is continuously introduced into the treatment zone to which very high voltage pulses are periodically applied, and fluid foodstuff is concomitantly withdrawn from the treatment zone, the rate of passage of the liquid foodstuff through the treatment zone should be coordinated with the pulse treatment rate so that all of the pumpable foodstuff is subjected to at least one pulse within the treatment zone. The liquid foodstuff may be subjected to treatment in a sequential plurality of such treatment zones, as will be described in more detail hereinafter.

In accordance with apparatus aspects of the present invention, pulsed field treatment apparatus for preservation of pumpable foodstuffs is provided comprising an electric field treatment chamber comprising a first electrode means for making electrical contact with liquid foodstuff disposed adjacent said first electrode means in said chamber, a second electrode means spaced apart from said first electrode means for making electrical contact with liquid foodstuff disposed in said chamber between said first electrode means and said second electrode means, solid dielectric separator means comprising a dielectric nonconductive spacer separating said first electrode means and said second electrode means externally of said chamber and having a minimum surface pathway length between said first electrode means, and said second electrode means of at least twice, and preferably at least 3 times the minimum distance between said first electrode means and said second electrode means in said chamber. The electrodes will also desirably be constructed such that the electric field strength at the edges of the electrode (upon application of a pulsed electric potential) does not exceed 1–5 times the average electric field over the surface of the electrode. This may be accomplished by proper electrode design, as will be discussed hereinafter, as by rounding the electrode edges to prevent undesirable field enhancement at sharp edges of small radius of curvature. The apparatus further comprising an inlet conduit means for introducing a pumpable foodstuff to be treated into said electric field treatment chamber, an outlet conduit means for discharging food product which has passed through said treatment chamber, means for applying high voltage electrical pulses to said first and second electrode means at a rate of at least about 0.01 pulse per second and preferably at least about 2 pulses per second to provide an electric field between said electrodes through a pumpable foodstuff located therebetween of at least about 25,000 volts per centimeter, and more preferably at least about 35,000 volts per centimeter. The apparatus further includes means for pumping a foodstuff through said inlet conduit means at a rate such that all of said fluid foodstuff is subjected to at least one pulse in transit through said high voltage treatment zone before it is conducted from the chamber through said outlet conduit means. Such apparatus may further include means for heating the foodstuff to a predetermined temperature of at least about 45° C., and more preferably at least about 55° C. before introduction to the treatment chamber, and may further include means for cooling the fluid foodstuff which has passed through said one or more treatment zones to a refrigeration temperature in the range of from about 0 to about 10° C.

If desired, the first and second electrode means may be constructed to prevent direct electrolysis of the fluid foodstuff upon application of a pulsed electric field thereto. In this regard, such electrodes may comprise an electrically conductive electrolysis electrode, an ion permeable membrane and an intermediate electrolyte, such that ionic electrical connection is made with the fluid foodstuff through the ion permeable membrane rather than by direct contact with the electronically conductive electrode, as described in U.S. Pat. No. 4,695,472, which is incorporated by reference herein.

As indicated, in accordance with the present invention, methods and apparatus are provided for processing of pumpable liquids, including thick and viscous fluids, solutions, slurries and/or mixtures of liquids and solid particulates with pulsed electric fields. The reliability, efficacy, range, and ease of electric field processing are augmented and extended by specific electrical equipment and design principles which permit application of high strength electric fields greater than about 25 kV/cm, with short pulse duration to reduce the required or desirable number of treatment pulses to achieve a desired level of preservation. Such method and apparatus may provide improved processing economics, greater flexibility in equipment design and engineering, the use of single pulse processing, an extension of the range of organisms and structures amenable to electric field processing, and an increase in efficiency of the process due to the reduction of energy required.

Figure 6:
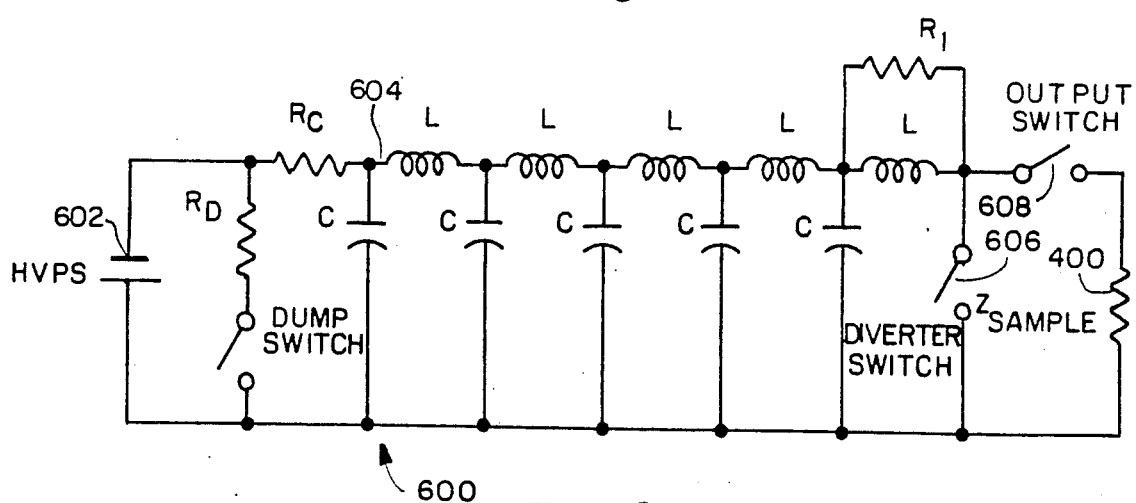
FIG. 6 is a schematic illustration of a high voltage power supply and pulse forming network for applying high voltage pulses to the test cell of FIG. 4.

In apparatus such as that described in FIG. 6 of the above-identified U.S. Pat. No. 4,695,472, the maximum electric field that could be applied to the liquids tested tended to be limited to about 20 kV/cm by the onset of electrical breakdown in the test chamber at higher electric fields for pulse durations of about 20 microseconds or greater. At high field strengths, the uniformity of the electric field and current density through the fluid foodstuff degrades as a function of time, with a tendency to produce arcs or current filaments. In addition, however, it was determined that such breakdowns occurred at the interface between the liquid and the dielectric insulator separating the two high voltage electrodes.

In accordance with the present invention, high electric field processing methods and apparatus are provided which utilize a treatment chamber or zone which provides for uniform field development and which separates the dielectric/liquid interface from the high electric field region so that electric fields much higher than 20 kV/cm can be applied to fluids. Also in accordance with such methods and apparatus, the pulse duration is controlled to prevent electrical breakdown of the food product. In this manner, very high electric fields such as pulsed fields in the range of from about 25 to about 100 kV/cm or more can be successfully applied to liquids and pumpable foods. Since the microbiological kill depends strongly on the electric field strength, such treatment methods and apparatus provide significant improvements in microbiological effects and may extend the range of organisms and structures affected by processing, and otherwise increase the effectiveness and effects of treatment.

It is important that the treatment region be designed to provide a high, relatively spatially uniform electric field in the treatment zone, while minimizing the capacity or conditions for electrical breakdown. To accomplish this, in accordance with various apparatus aspects of the present invention, the insulator separating electrodes of appropriate electrical polarity is removed from the high field region to avoid breakdown produced by electrical tracking or flashover along the insulator surface. It is also important that the electrode surfaces be designed to minimize field enhancement since such field enhancement increases the electric field locally and can result in electrical breakdown. In accordance with continuous flow treatment aspects of the present invention, the treatment electrodes and treatment zone defined therebetween may be rotationally symmetrical about a central axis of rotation, as will be described in more detail. In addition, it is important that all of the liquid or other pumpable food product receive adequate treatment and that none of the liquid or pumpable food be permitted to receive less than the full treatment necessary to obtain the desired microbiological results. By coordinating the pulse repetition rate with the continuous flow treatment chamber design, such a treatment regimen can be assured.

As indicated, treatment chambers are provided in accordance with the present invention, which are designed to minimize the potential for electrical breakdown along the insulator surface separating the two electrodes. The potential for electrical breakdown at the insulator can be minimized by (1) removing the insulator from the region of high electric field, (2) removing the "triple point" (i.e., the interface between the electrode, insulator, and liquid or pumpable food) from the high field region, (3) increasing the length of the insulator (4) placing the insulator at an angle to the electric field, and/or (5) reducing electric field enhancement by appropriate design of the shape of the electrodes. These design principles are instrumental to successful processing at high electric field strengths.

Figure 4:
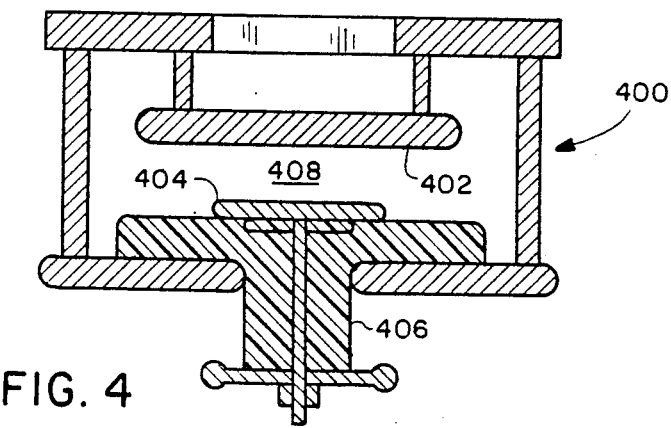
FIG. 4 is a schematic cross sectional view, taken through the axis of rotational symmetry, of an embodiment of a static pulsed electric field batch treatment test cell which is particularly designed for applying very high voltage pulsed electric fields to perishable liquid food products together with an electrical schematic diagram of high voltage pulse generation circuitry for the test apparatus.

A batch processing chamber 400 incorporating uniform high field design principles in which the electrodes are oriented in a parallel plate geometry is shown in cross section FIG. 4. The chamber 400 has parallel circular electrode plates 402, 404 which define a treatment zone for a stationary food product. Although food products may be treated under batch conditions, in order to treat liquid and other pumpable foods in a commercially effective manner, it is desirable to flow products through a treatment region where a pulsed high electric field is applied.

However, high electrical pulsed field treatment chambers designed to permit high electric field strength processing of flowing pumpable foods are desirable for volume processing. In such systems, each element of the product flows through a treatment region bounded by coaxially aligned electrodes where a high electric field is applied. In the coaxial geometry chamber design in which an inner cylindrical electrode is surrounded by an outer annular cylindrical electrode with the treated volume confined or flowing between, field fringing or loss of effective field strength at each end of the cylindrical treatment chamber may be a serious disadvantage. Unless the length of the treated volume is very long compared to its diameter, this arrangement will result in low efficiency. If, on the other hand, the treatment chamber is very long compared to its diameter, it will have very low electrical resistance for pumpable foods with even moderately low resistivity creating difficulty in the electrical pulser design. However, by use of appropriate design techniques, high performance coaxial treatment cell designs may be provided.

Figure 2:
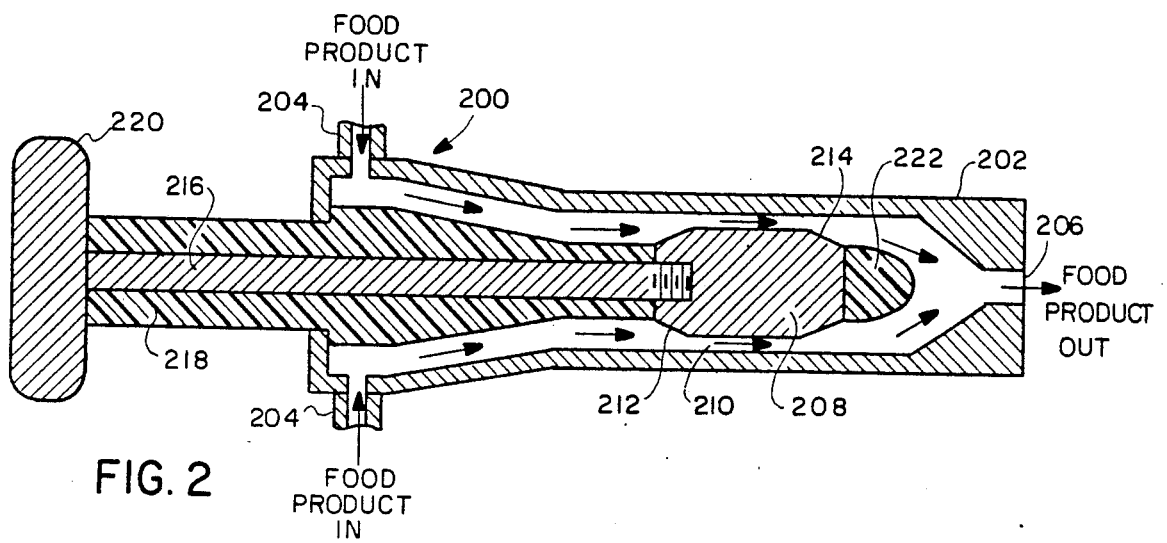
FIG. 2 is a cross sectional side view, taken through the axis of rotational symmetry, of an embodiment of a pulsed electric field treatment processing cell having a modified coaxial geometry designed to provide for increased pulse stability, which may be utilized in the system of FIG. 1.
Figure 3:
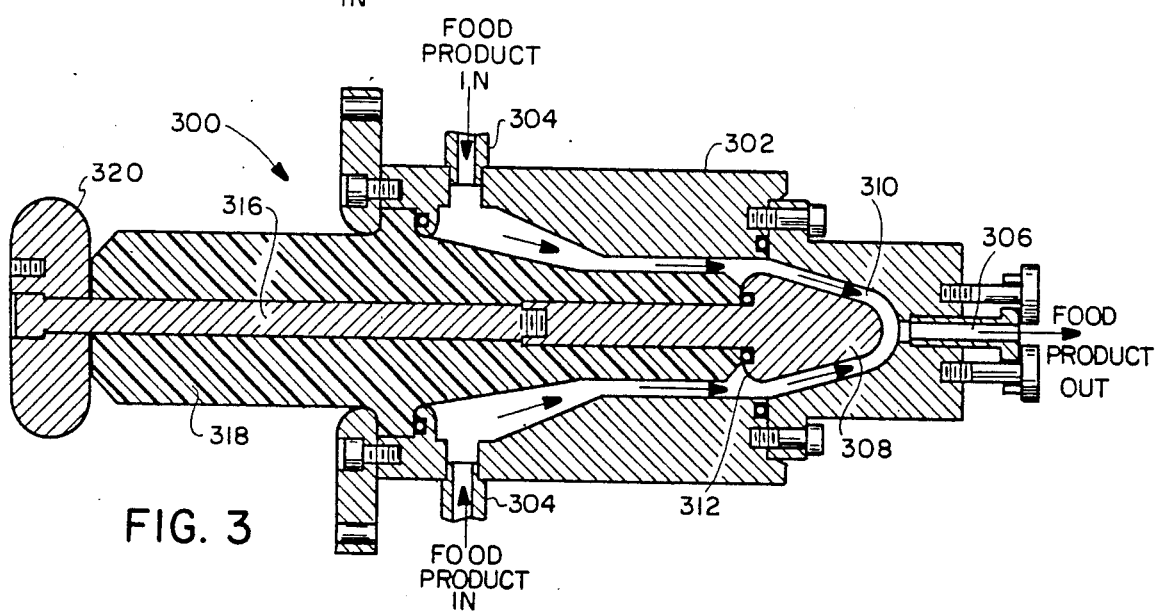
FIG. 3 is a cross sectional side view, taken through the axis of rotational symmetry, of another embodiment of a pulsed electric field treatment processing cell which may be used in the apparatus of FIG. 1 having a coaxial geometry with a long tracking path on the insulation surface separating the two high voltage electrodes, which may be utilized in a continuous flow processing system of the type illustrated in FIG. 1.

In this regard, the pulsed field treatment cells illustrated in FIGS. 2 and 3 are coaxial treatment chambers which are effective for high voltage pulse treatment. In these modifications, one end of the coaxial arrangement is closed, except for the inclusion of an inlet or outlet port. Field fringing is reduced by the design and can be further reduced with the proper choice of materials. Additionally, the design incorporates features which can be used to control fluid and particulate flow patterns to minimize eddying and reduce mixing between treated and untreated product regions.

The design principles described herein for the high electric field processing of pumpable foods may be incorporated in other geometric arrangements which include but are not limited to radial disc geometries, spherical geometries, concentric cylinders with elliptical or other non-circular cross sections. Such high field pulse treatment cells may use electrical design principles listed above to minimize the potential for electrical breakdown, use proper contours in the flow channel to control fluid and particulate flow patterns to optimize treatment, use an appropriate geometry to assure that all elements of the pumpable food must pass through the electric field treatment zone before exiting the treatment chamber, and use electrodes designed to minimize the loss of efficiency due to electric field fringing in regions near the ends of the treatment zone.

Control of pulse duration is an important aspect of the present invention. The use of high electric fields with short pulse duration which may be provided through the use of high field treatment chambers as described herein, may be utilized to produce increased efficiency of treatment of pumpable foods. In this regard, the electrical energy consumed in each pulse is:

$$W = \frac{E^2}{p} \tau V,$$

where W is the electrical energy in joules, E is the electric field in volts per centimeter, p is the electrical resistivity in ohm centimeters, $\tau$ is the pulse duration in seconds, and V is the treated volume in cubic centimeters. Since the microbiological kill is a very strong function of electric field and a much weaker function of the pulse duration, it is possible to increase the electric field E and reduce the pulse duration $\tau$ in accordance with the present disclosure so that the product $E^2\tau$ is reduced, and the energy consumption is therefore reduced, but the microbiological kill is significantly increased.

In addition, electrochemical effects can be minimized through the use of short pulses and high electric field. The electrochemical effects (e.g., electrolysis) depend on the electrical charge transferred. The electric charge transferred per unit area is given by:

$$Q = \frac{\tau w}{p},$$

where w is the electrical input energy per unit volume. Thus, reducing the pulse duration, even at constant electrical input energy, reduces the electrical charge transfer and electrochemical effects.

Desirably, the pulse duration will be in the range of from about 0.01 microseconds to about 10 microseconds at pulsed field strengths in excess of 30 kV/cm. The use of treatment zone electric field pulses above 25 kV/cm or more preferably above about 35 kV/cm and one or multiple pulses with pulse durations of from about 10 nanoseconds to about 20 microseconds, and preferably in the range of from about 0.1 to about 10 microseconds duration can be expected to result in significant increases in the effectiveness of the process, improvements in the efficiency and economy of the process, and reduction of electrolytic effects.

In accordance with the present methods, a long tracking pathway electrode treatment zone having a first electrode and a second electrode defining a substantially uniform electric field treatment zone therebetween and a nonconductive dielectric insulator separating the first electrode from the second electrode externally of the treatment zone by a surface route distance at least twice the minimum distance between the first and second electrodes in the treatment zone. Further in accordance with such methods, all of the pumpable foodstuff is introduced into the long tracking pathway electrode treatment zone and is subjected to at least one high electric field pulse, having a minimum field strength of at least 25,000 volts per centimeter, and preferably at least about 35,000 volts per centimeter, and having a duration of from about 0.1 microsecond to about 25 microseconds to provide a high electrically field stressed pumpable foodstuff. All of the pumpable foodstuff should be subjected to at least 1 high electric field pulse, and desirably at least 2 pulses in many food preservation systems. The treatment interval between pulses should desirably be less than about one minute, and preferably less than about one second. By the "duration" of an electric field pulse is meant the length of time the electric field exceeds the minimum field strength. As indicated, all of the electrically stressed fluid foodstuff should be subjected to at least one multiple pulse treatment.

It is also desirable that the pumpable foodstuff be subjected concomitantly with the high voltage electric field pulses, to pulses of high electrical current density uniformly through the foodstuff in the treatment zone having a duration of at least about 0.01 microsecond, and preferably in the range of from about 0.1 microsecond to about 25 microseconds. Typically, for pumpable fluid food products having an electrical resistivity in the range of from about 1 to about 1000 ohm-centimeters, the peak current density of the current pulses should be at least about 5 amperes per square centimeter, and more preferably at least about 15 amperes per square centimeter through the food product in its long tracking pathway, high voltage electrode treatment zone.

The electrically stressed pumpable fluid foodstuff should be maintained under substantially sterile conditions, and may be packaged to provide a packaged food product having extended shelf life. Desirably, the electrically stressed fluid foodstuff may be maintained and packaged under aseptic conditions after being subjected to the pulsed electric field treatment.

In order to maintain high electric fields in the treatment chamber, it is also important that the pumpable food product be void-free. In addition, it is desirable that the capacity of the food product to evolve gas bubbles under electric field treatment conditions be minimized. Accordingly, high electric field processing methods should best include the control of gases absorbed in the pumpable food. The effect of absorbed gas in the pumpable food is to cause electrical breakdown in the pumpable food. This can be avoided by degassing the pumpable food by means of a vacuum pump and a degassing arrangement or other method to remove the suspended dissolved or trapped gas from the pumpable food. Another approach which helps minimize the potential for electrical breakdown in the pumpable food is to perform the treatment with the pumpable food under pressure. Use of positive pressure on the pumpable food reduces the formation of gas bubbles in the pumpable food which can lead to electrical breakdown when high electric fields are applied and generally reduces the likelihood of electrical breakdown. The use of positive pressure also permits operation at temperatures above the atmospheric boiling point. Pressures up to 1000 psi or more may be used in the treatment chamber.

In accordance with various preferred aspects of the present invention, the temperature at which the fluid foodstuff is treated may be controlled to substantially increase the shelf life of the treated product. In this regard, all of the food product may be subjected to at least one such high voltage uniform electric field pulse at a temperature of at least about 45° C. and more preferably, at least about 55° C. as described in U.S. Pat. No. 4,695,472. By subjecting the fluid food product to pulsed electric field treatment at pasteurization temperatures, such as in the range of from about 63° C. to about 75° C., substantially improved shelf life extensions may be achieved over those obtained by pasteurization alone, without the adverse effects on the fluid food product which result from UHT treatment at high temperature. However, at such elevated temperatures even below pasteurization temperatures (e.g., 45–63° C.), substantial synergistic improvement in food preservation and shelf life extension may be provided. In addition, by promptly cooling the electric field treated liquid foodstuff to a refrigeration temperature of less than about 10° C., and preferably in the range of from about 0° C. to about 9° C., further substantial improvement in shelf life may be obtained, and the process made more effective. As described in the above-identified U.S. Pat. No. 4,695,472, desirably, the food product should be cooled to refrigeration temperature within 30 minutes, and preferably within 3 minutes of the electric field treatment. The high voltage electrical field treated fluid foodstuff may be rapidly cooled by means of continuous flow heat exchange units prior to packaging or bulk storage. In this manner, it is believed that electrically treated organisms having cell wall damage may be cooled to an inactive condition before cell wall repair may be accomplished, thereby enhancing the product shelf life.

Electric field treatment should best be carried out with pulses having an electric field strength in the range of at least about 25 kilovolts per centimeter and preferably in a range of from about 35 to about 120 kilovolts per centimeter. Depending upon the application, i.e., the selective killing of a particular organism versus the broad spectrum killing of mixed bacterial populations, pulse duration should best be in the range of from about 0.1 to 25 microseconds with the most preferred values between 5 and 10 microseconds. The variation of pulse duration may be used to control heating within the liquid food product being treated. For example, long pulse lengths can be used to raise the temperature of the sample to temperatures synergistic with the electrical effect; multiple, short square wave pulses can then be rapidly delivered to complete the treatment.

Sequential electric field (and concomitant electric current) pulses may be of the same polarity, or may be of sequentially alternating polarity. It is also noted that the electric field pulse may preferably be established between electrodes having respective positive and negative polarity with respect to a ground potential, or between electrodes, one of which is maintained generally at ground potential and the other of which is pulsed at either positive or negative potential with respect to ground potential. High voltage electric pulses may also be provided, however, between electrodes, both of which are at either positive or negative potential with respect to ground potential.

Heat applied before or during electric field treatment may be used to produce microbiological kill rates in the fluid foodstuff greater than those obtainable by electric field or heat treatment alone. The elevation of heat during treatment to a temperature stressful to but not necessarily lethal to microorganisms for the time employed, is believed to exaggerate the membrane damage sustained during treatment. This may occur through an increase in membrane fluidity or porosity, producing greater damage per treatment dosage, a decrease in the capability of the damaged microorganism to effect repair during and after treatment due to the disruptive effects of such stressful temperature elevation upon cellular metabolism, and/or an increase in any osmotic effects secondary to the electric field membrane damage. By rapidly cooling the electrically treated fluid foodstuff to a refrigeration temperature, it is believed that the normal cellular mechanisms for repair or decrease of the electric field-induced cell membrane permeability are retarded, thereby increasing cell vulnerability and decreasing the reproductive capacity of remaining bacteria or spores which survive the electric field treatment.

When microorganisms are subjected to high electric fields under appropriate conditions, cell permeability is established and transcellular ion and osmotic flow may occur. This flow may be interrupted because biological membranes are exceptionally resilient and the induced transmembrane pores resealed in time for the cell to survive. A permeable cell which is not destroyed by the electric field treatment must reseal its membrane, reestablish active transport, and readjust its internal ionic and fluid content if it is to survive.

In nutritive media such as milk, natural fruit juices and natural liquid egg products, cells that are actively growing at the time of treatment may recover under appropriate conditions. However, in accordance with the present invention, effective processing may be carried out in nutritive media by temperature control. Incubation at refrigeration temperatures after treatment can reduce the metabolic level of electrically treated microorganisms and hence tend to diminish recovery and repair. Similarly, elevation of the temperature of the sample during treatment may be used to increase the kill level; in a manner similar to cooling, the heat affects cellular metabolism at temperatures greater than the growing temperature of the bacteria, even though the elevated temperature may be less than that which kills through immediate exposure.

Even though the treatment temperature is not high enough to produce significant shelf life extension by itself, elevated temperatures which stress the treated bacteria can greatly enhance the kill and shelf life extension provided by the treatment. Moreover, posttreatment incubation conditions further significantly affect the shelf life extension. Electrically treated liquid food products incubated at room temperature after treatment may begin to regenerate immediately, whereas samples incubated at refrigeration temperatures (4-9° C.) typically are inhibited. These observations are believed to relate to the degree of repair occurring during and after sample treatment.

Having generally described various aspects of the present invention, uniform electric field treatment of pumpable food products in accordance with various aspects of the present invention will be more particularly described with respect to the processing system which is schematically illustrated in FIG. 1. As shown in FIG. 1, the very high electric field food processing system comprises a storage reservoir 100 for the pumpable food product to be treated, which in the illustrated embodiment is a fluid food product such as a soup, beverage, fluid dairy product or fluid egg product. The apparatus further includes an optional inline heating unit 102, a deaeration apparatus 104 having a suitable vacuum system 106 associated therewith, and a long pathway uniform electric field treatment cell 108 of very high field stability coaxial design as will be described in more detail hereinafter, in which the electric field treatment of the liquid foodstuff is carried out. The treatment cell has associated therewith a cell monitor 110 having appropriate sensor instrumentation to monitor the temperature and voltage conditions within the cell. The high voltage pulses to the cell are provided by high voltage pulser 112, which may be a high voltage lumped transmission line circuit, properly impedance matched to the treatment cell, a Blumlein transmission line circuit properly impedance matched to the treatment cell 108, a capacitive discharge circuit, such as a discharge circuit of the type shown in FIG. 4, or other suitable high voltage discharge apparatus for providing high voltage pulses in excess of 35,000 volts and a duration in the range of from about 0.5 to about 10 microseconds. The temperature and voltage information from the cell monitor 110 is provided as a data input stream to the system control and analysis microprocessor 114, which controls the operation of the high voltage pulser 112. The system control and analysis microprocessor 114 is provided with a production line interface 116 which is adapted to interface with automated production line apparatus having computer control systems. The illustrated electric field processing system further may comprise optional refrigeration apparatus 120 for cooling the treated process stream from the heat exchanger 118 to provide a refrigerated, electrical field treated foodstuff stream for aseptic packaging apparatus 122. The packaging apparatus 122 packages the treated process stream into either individual sterilized consumer packages 124 or sterilized bulk transport containers which are stored in refrigerated storage apparatus 126 until delivery to the consumer. In operation, the liquid food product to be treated, which in the illustrated embodiment may be fluid milk, a natural fruit juice such as orange juice, or a liquid natural egg product, is pumped from the storage reservoir 100 to the heat exchange unit 118 so that the heat energy is conserved within the treatment system. In this regard, the treated liquid food product which has passed through the cell 108 is conducted into heat exchange relationship with the liquid food product which is to be introduced into the treatment cell 108 by means of heat exchanger 118. After exiting the heat exchange unit 118, the fluid food product to be treated may be heated to a predetermined temperature by heating unit 102. The extent of such heating, if any, is determined by the desired processing temperature within the electric pulse processing cell 108. Because the electric cell treatment may also raise the temperature of the liquid food product, the degree of heating provided by the heating unit 102 may depend in some measure upon the efficiency of the heat exchange unit 118. Typically, the temperature of the pumpable product emerging from the heating unit 102 may be at least about 40° C., and in some cases may be at least about 50° C. or more.

The heated food product stream from the heating unit 102 is conducted to the deaeration unit 104. In the unit 104, the liquid may be subjected to vacuum conditions of at least about 20 inches of mercury in order to remove dissolved gases and/or product bubbles which might adversely affect the development of a substantially uniform electric field in the treatment cell 108. It is noted that pumpable food products such as beer, soft drinks and sparkling wines which contain dissolved gases may also be processed, but would be adversely affected by vacuum deaeration. Such products may be processed at elevated pressures such as superatmospheric pressures in the treatment cell of at least about 50 psia, such as a pressure in the range of from about 100 to about 2000 psia, at which the gas remains in solution without forming bubbles to distort the uniformity of the high voltage electric processing field. Other foods may also be processed at super-atmospheric pressures, with or without previous vacuum deaeration.

The deaerated liquid food product is continuously passed through the long surface pathway high stability electric pulse treatment cell 108, in which it is subjected to at least one, and preferably at least 2 high voltage electric pulses at a field strength of at least about 35,000 volts per centimeter and a duration in the range of from about 2 to about 10 microseconds. In the illustrated embodiment, at least one of the pulses is carried out at a temperature in the range of from about 50° C. to about 70° C. The treated liquid food product is conducted back to the heat exchange unit 118 where it is cooled by the incoming liquid food product, and is subsequently conducted to refrigeration unit 120 where it is cooled to a temperature of less than about 10° C., and preferably less than about 5° C. within about one minute of its pulsed electric field treatment. While in the illustrated embodiment, the refrigeration unit is used to substantially immediately cool the product in an energy efficient manner, it is noted that the product may also be cooled after it is packaged. The cooled, electrically treated liquid food product stream is subsequently introduced as an input stream to aseptic packaging apparatus 122 which packages the product in sterilized containers 124 under sterile conditions. The packaged product containers 124 are maintained under refrigeration conditions by appropriate refrigeration storage apparatus 126 until distribution to the consumer. Such storage apparatus may include refrigeration storage units at the packaging plant, refrigeration transport units in the distribution system, and refrigeration storage units at the distribution warehouse, grocery store or other consumer distribution center. Because of the extended shelf life properties provided by the electric pulse treatment, such refrigerated storage may be carried out over an extended period of time while maintaining the freshness and keeping qualities of the processed food product.

Illustrated in FIG. 2 is an embodiment 200 of a continuous flow, long dielectric pathway electric pulse treatment cell which may be utilized as a treatment cell 108 in the apparatus of FIG. 1.

The cell 200 is designed in a modified coaxial geometry to provide a long tracking path on the insulator surface and to assure complete treatment of the food product as it flows through the electrode region. As illustrated in FIG. 2, which is substantially to scale, the cell 200 comprises an outer metallic electrode 202 which forms an exterior housing for the cell and which has inlet ports 204 for introducing the pumpable food product into the cell 200 for treatment, and an outlet port 206 for withdrawing the treated food product from the cell. The outer electrode 202 may be fabricated of a suitable inert food-grade sanitary metal such as stainless steel or a nonmetallic inert conductor such as polished pyrolytic carbon or high strength graphite, and is generally maintained at ground potential. The cell 200 further comprises an inner, high voltage electrode 208 which may be similarly fabricated from such inert metallic or non-metallic conductors, having a central body of greatest diameter which forms a product treatment area 210 with the outer electrode 202. The inner, high voltage electrode 208 has tapered surfaces 212, 214 at its respective proximal and distal ends. These tapered surfaces, located at each end of the high voltage electrode, guide the flow of liquid with minimum disruptions, reduce eddying or product flow stagnation, reduce convective or other mixing, and control the electric field to prevent breakdown. The electrode 208 is supported and electrically connected to a high voltage pulser by metallic connecting rod 216 which is completely surrounded by insulator 218, which may be of ceramic or plastic (e.g., polyethylene or polypropylene construction). A high voltage brushing 220 at the external end of the insulator 218 prevents breakdown of the air surrounding the electrodes and is used to introduce the high voltage into the cell. An insulating (plastic, ceramic, etc.) cap 222 on the end of the high voltage electrode 208 is also designed to control flow and block current from the end of the electrode. Current on the end of the electrode reduces electrode efficiency by fringing or grading into a lower field strength region and does not produce the most effective killing of bacteria.

The metallic or carbon electrodes 202, 208 may form electrodes in direct contact with the fluid food product to be treated, as shown in FIG. 2. However, the electrodes 202, 208 may also be of ionic conductor construction such as described in U.S. Pat. No. 4,695,472.

The thickness of the cell treatment zone 210 along the direction of the electric field may desirably be at least about 0.1 centimeter and will preferably be in the range of from about 0.5 centimeter to about 3 centimeters. The radius of the outer wall of the electrode 208 may desirably be at least about 3 centimeters, and preferably will be at least about 10 centimeters for high volume processing systems. The treatment unit 200 is rotationally symmetrical in shape about its longitudinal axis, and may be utilized in a parallel or series array of a plurality of such cells to form the treatment apparatus 108.

In operation, the fluid food product to be treated, such as liquid milk or natural liquid fruit juice, is introduced through input ports 204 while high voltage electric pulses which provide a field strength in the treatment zone of at least 35,000 (e.g., 35,000-45,000) volts per centimeter for a duration of less than 10 microseconds (e.g., from about 2 to about 5 microseconds) are repetitively applied to the metallic electrode 208 through bushing 220 at a rate coordinated with the rate of flow of the food product through the zone 210, such that all of the food product is subjected to at least one high intensity pulse in the zone 210, and preferably for a variety of food products, a plurality of at least two pulses is applied during the transit time of the most rapidly traveling component of the food product introduced through the zone 210. In this regard, arrow 224 indicates a maximum transit distance of food product in the zone 210 between pulses. The food product is at a temperature of at least 55° C. (e.g., 60-75° C.) in the treatment zone 210. In this manner, all of the food product is subjected to at least one high field pulse at elevated temperature. It will also be appreciated that the flow through the cell could be reversed.

Upon exiting the treatment zone 210, the treated liquid is conducted from the zone by conduit 206, which may form the input conduit to another treatment unit 200. The length of the liquid in the treatment conduit 206 may be relatively long in comparison with the thickness of the treatment cell, in order to limit the electrical conductance between the cells. The treated food product is cooled and aseptically packaged within three minutes to a temperature of less than 9° C. It has excellent shelf life and keeping qualities.

It will be appreciated that, in the absence of cooling between cells 200, subsequent cells may operate at a higher temperature in view of the heating of the liquid food product being treated. Because the conductivity of the food product tends to increase with increasing temperature, higher currents may be provided in subsequent cells for a given pulse potential, which may beneficially enhance the shelf life of the treated product. A plurality of at least two treatment cell units 200 and preferably from about 3 to about 10 such units may be utilized to form an electric pulse treatment unit if multiple treatment is desired.

It may be desirable to degas the liquid food product issuing from a cell unit prior to introduction into a subsequent cell unit in the treatment apparatus. Accordingly, for example, a vacuum degassing apparatus may be provided at outlet conduit 206 for degassing of the output stream to produce a degassed, treated stream for introduction into the subsequent cell.

Another embodiment 300 of a continuous flow treatment cell for treatment of pumpable foods with electric fields is shown in FIG. 3. The cell design is a modified coaxial treatment arrangement with a long tracking path on the insulator surface separating the two high voltage electrodes. In this regard, the cell 300 is similar to the cell 200 in that it has an outer metallic electrode 302 having inlet ports 304 and outlet port 306. An inner, high voltage electrode 308 forms a product treatment zone 310 with the inner surface of the electrode 302, and has a surface 312 curving away from the electrode 302 at the end of the treatment zone to reduce the field strength at the edge of the zone. A dielectric separator 318 having a long surface path covers a metallic electrode connecting rod 316 to prevent surface breakdown tracking. A curved bushing 320 is provided for application of high voltage pulses to the cell 300.

Having generally described methods, apparatus and processing systems, various aspects of high voltage pulsed electric field treatment of specific liquid food products utilizing a laboratory scale pulsed electric field treatment apparatus of FIG. 4 will now be described. Illustrated in FIG. 4 is a pulsed electric field treatment static test cell 400, which is illustrated substantially to scale, has two substantially parallel stainless steel electrodes 402, 404 which form a test chamber zone 408 with a rotationally symmetrical polyethylene separator 406. The cell 400 is rotationally symmetrical about its central axis of rotation, with the electrodes 402, 404 and dielectric separator 406 being circular in cross section perpendicular to the axis of rotation.

A liquid foodstuff to be treated may be inserted through a small hole in electrode 402 to completely fill the chamber 408. Electric pulses may be applied to the cell by means of the capacitative pulser 600 shown in FIG. 6 which comprises a conventional high voltage power supply 602, together with a pulse forming network 604 which directs pulses to the respective electrodes of the cell 400 through the impedance load of the liquid in the cell 400 (shown in FIG. 6 as $Z_{sample}$).

In order to determine the electric field breakdown levels for various conductive liquids and to treat such liquids, the laboratory bench-top pulser 600 and test cell 400 as shown in FIGS. 4 and 6 comprising a 2Ω, 22μs pulse forming network (PFN) and a high field test chamber was utilized. This apparatus was used to test saline solutions, apple juice, milk, filtered and unfiltered orange juice and deionized water to determine the combinations of electric field strength and pulse duration where electric breakdown of these fluids occur.

The apparatus was designed to have a variable pulse width of from about 2 to about 20μs with a substantially flat top at each pulse width.

A typical design load resistivity for the liquids treated was in the range of 100 to 1000Ω-cm, resulting in a 1 to 10Ω load, Z sample, in the test cell 400. The apparatus operated in air, and was designed to deliver 50 kV to a 10Ω load.

As shown in FIG. 6, the apparatus utilizes a low impedance pulse forming network 602 chosen to have an impedance of less than 2Ω to obtain the majority of the charge voltage on the load.

Rather than remove stages of the pulse forming network to vary the pulse width, the circuit 602 uses a diverter switch circuit 606 to terminate the pulse at the desired time to provide a pulse which has the same shape (squareness) at any pulse width.

The maximum preferred pulse width is about 10 microseconds for the illustrated apparatus 400; however, a 20μs pulse forming network was chosen to further improve the degree of flatness of the output pulse in order to produce very similar output pulses at all pulse widths for meaningful comparisons from the experimental data.

For a pulse forming network with five identical 2Ω stages and a two-way transit time of 20Ωs.

The component values chosen for the pulse forming network 600 were 1.2μF capacitors C and a stage inductance L of 4.8 μH. This gave a pulse width of 22 μs.

The pulse forming network components consist of capacitors, inductors, buswork, switches, trigger generators, and a high voltage power supply with internal dump circuit. The capacitors C were Maxwell SS series capacitors Model 31427 which are low inductance and relatively low dissipation capacitors. The inductors L consisted of 8 inch diameter coils 3 inches long with 3 turns. Each coil used RG-218, with the outer braid removed, as the insulated wire. This reduces the hazard of electrical shock from the coils which are at high voltage when the pulse forming network is charged. The buswork was made from ⅛ inch thick aluminum plate and angles. At high field points, the buswork was wrapped with a layer of high dielectric constant material and then with a layer of semiconducting material, each made by Sigmaform. These materials grade the electric fields at the high stress points. Maxwell Model 40359 spark gaps were used as the pulse forming network output and diverter switches 608, 606. These switches are capable of 5 Coulombs at 50 to 150 kV, 350 kA maximum, and have an inductance of 100 nH. The switch has a midplane geometry with low jitter irradiated triggering. This switch is capable of handling the large coulomb transfer of the diverted or shorted pulse forming network and can operate reliably at 50 kV in air. However, to reduce the operating voltage range to 20 to 80 kV, electrode spacers were inserted to reduce the midplane-to-electrode distance to 0.25 inch. The spacers were parts from another switch with lower operating voltage and the same housing.

These switches can be triggered by a 50 kV trigger generator like the Maxwell Model 40168 trigger generator. Two such trigger generators were used, a 40107 and a modified 40230. The 40107 is the predecessor of the 40168 which is essentially identical to the 40168, except that it requires a separate gas controller where the 40168 has one built in. The 40230 is identical to the 40168, except that it has a 100 kV output instead of 40 kV.

A conventional 100 kV power supply 602 was used to charge the pulse forming network 604.

Figure 5:
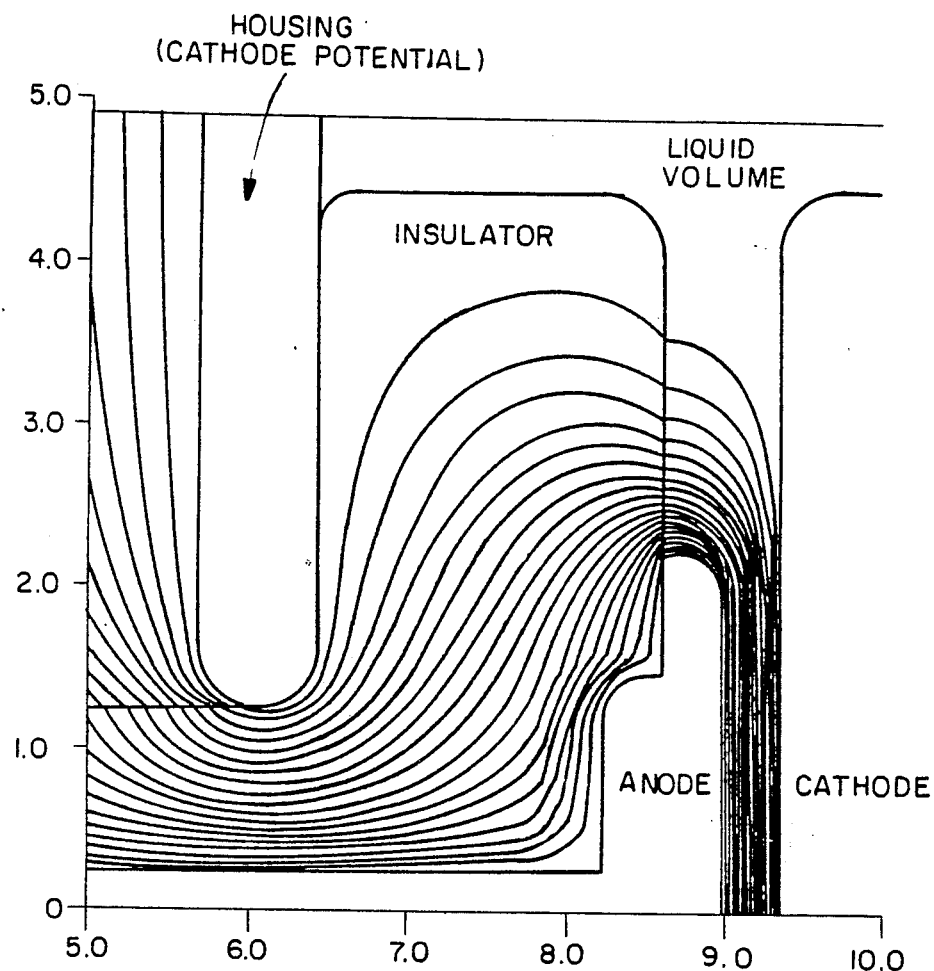
FIG. 5 is an electric field plot of the batch high voltage batch treatment cell of FIG. 4 showing field distribution equipotential lines calculated for application of a high voltage pulse across the cell electrodes.

The fluid breakdown test chamber 400 (FIG. 4) was designed so that the insulators are not in the region of high electric field. Thus, only the liquid under test is subjected to the high electric field stresses. As shown in FIG. 4, the parallel electrodes 402, 404 and the outer housings are made of stainless steel. The insulator 406 is high density polyethylene. The test chamber is sealed with O-rings (FIG. 5). The chamber had four $\frac{1}{4}$-NPT holes for filling and draining and two polycarbonate view ports (not shown).

The parallel electrodes 402, 404 have a spacing of 0.5 or 1.0 cm. Each electrode has a radius on the edge to minimize field enhancement. The anode area is 100 cm$^2$. An electric field plot of the test cell is shown to scale in FIG. 5, with the scale of the axes being in inches. The electrodes are bead-blasted to condition them prior to testing. Bead-blasting the electrodes minimizes the statistical spread of the breakdown data by creating small field enhancements uniformly over the electrode surface. Diagnostic apparatus (not shown) was also utilized with the cell 400 and pulse network 600.

The diagnostics consist of a 100 kV dc high voltage monitor, a load or output voltage probe, and a load current monitor. The 100 kV dc high voltage probe is a Maxwell 1000:1 resistive probe whose total resistance is 1 G$\Omega$. The monitor uses a Fluke DVM to display the voltage reading where 1 V on the meter equals 1000 V on the high voltage end of the probe. The output voltage was monitored with a 2.6 k$\Omega$ resistive voltage divider also made by Maxwell. A Rogowski coil was used to monitor the load current. The coil was wound on RG-214 coaxial cable.

A passive integrator was used to integrate the signal and the result was displayed on an oscilloscope.

Initial tests with the pulse forming network 602 were performed into a short circuit load and also into a 20$\Omega$ load. These tests provided information to verify performance of the pulse forming network.

FIG. 7 shows the current with the pulse forming network operating into a short circuit. FIG. 8 shows the pulse forming network operating into a 20$\Omega$ load. FIG. 9 shows the rise time with a 20$\Omega$ load.

Breakdown studies were performed on saline solutions, apple juice, milk, filtered and unfiltered orange juice and deionized water. Each liquid was tested with a 20$\mu$s square pulse at the maximum voltage the network 600 could apply to the sample. The maximum voltage which can be applied to the sample under the tests is given by equation:

$$V_L = V_C \frac{Z_L}{Z_0 + Z_L}$$

where
- $V_C$ = the pulse forming network charge voltage
- $V_L$ = the load voltage
- $Z_O$ = the pulse forming network impedance
- $Z_L$ = the load impedance Due to the low resistivity of the samples, it was not possible to reach the breakdown level of the samples during the 20$\mu$s pulse duration. The following table summarizes the measured maximum electric field strength which could be applied to each sample.

Summary of Electric Field Strength Tests

| Fluid | Average Electric Field (kV/cm) |
|---|---|
| 1 k$\Omega$-cm salt solution | 86 |
| 300 $\Omega$-cm salt solution | 52 |
| Apple juice | 42 |
| Milk | 24 |
| Orange Juice | 22 |
| Filtered Orange Juice | 28 |
| Deionized Water | 102 at 8 $\mu$s |

SALT SOLUTIONS

Two salt solutions, 1 k$\Omega$-cm and 300 $\Omega$-cm were tested with a 20$\mu$s pulse to a maximum electric field strength of 86 kV/cm and 52 kV/cm, respectively. The electrode gap spacing was 0.5 cm, the pulse forming network was charged to the maximum voltage of 51 kV and neither sample suffered a breakdown during the 20$\mu$s pulse.

The applied voltage waveform of the 1 k$\Omega$-cm salt solution is shown in FIG. 10. When the pulse forming network was charged to 51 kV and diverted at 20$\mu$s, the average electric field applied to the sample was 86 kV/cm and the sample did not break down.

If the pulse forming network was not diverted, the sample would break down in the tail of the mismatched pulse forming network waveform.

The applied voltage waveform of the 300 $\Omega$-cm solution is shown in FIG. 11. Due to the low resistivity of the solution and the subsequent voltage division between the pulse forming network and the load, the pulse forming network could not be diverted even at the maximum charge voltage of 51 kV. This could be overcome by simply rearranging the position of the output and diverter switches; however since the sample did not break down in this worst case test, this was not necessary. The average electric field strength applied to the sample was 52 kV/cm.

APPLE JUICE

At 51 kV charge voltage, the average electric field strength was 42 kV/cm and the sample did not break down. The applied voltage waveform is shown in FIG. 12.

MILK

The average electric field strength applied to the sample with 51 kV charge voltage on the pulse forming network was 24 kV/cm. The milk did not break down during the 20$\mu$s pulse as shown in FIG. 13.

ORANGE JUICE

Fresh squeezed unfiltered orange juice was tested to a maximum electric field strength of 22 kV/cm. The sample did not break down during the 20$\mu$s square pulse; however, it did break down during the reverse voltage portion of the waveform. The particulates in the juice were on the order of the gap spacing in size. The applied voltage waveform is shown in FIG. 14.

The orange juice was filtered using a wire mesh strainer typically found in the kitchen. This removed the large particles; however, it did allow some visible particles to get through. The applied voltage waveform of the filtered orange juice is shown in FIG. 15. The average electric field strength was 28 kV/cm. The sample withstood the initial 20μs square pulse, but it did break down during the voltage reversal.

DEIONIZED WATER

Because deionized water has been extensively tested in the pulsed power community, it was tested as a bench mark for these tests. The water tested was bottled water which had a resistivity of 145 kΩ-cm. The deionized water was tested up to 102 kV/cm corresponding to a pulse forming network charge voltage of 51 kV. The water was tested to a maximum pulse width of 8μs. The test waveform is shown in FIG. 16.

SUMMARY

A 2Ω, 22μs, 50 kV, five stage, air insulated pulse forming network was designed, constructed and tested. The pulse forming network delivers pulses of variable pulse width by using a diverter rather than removing pulse forming network stages. The pulse forming network was tested to 50 kV charge voltage and found to reliably produce a square (i.e., flat-top) pulse at any pulse width up to 22μs.

The pulse forming network was used to obtain initial break down strength data of various low resistivity solutions. The solutions tested include saline, milk, apple juice, orange juice and deionized water. Due to the varying resistivity of the solutions, they were not tested to the same electric field strength. With the 2Ω pulse forming network, the breakdown of voltage of each solution could not be reached. This can be overcome by reconfiguring the pulse forming network to have a lower impedance and a shorter pulse width or by using the pulse forming network as a capacitor bank and diverting the bank at the desired time.

The results obtained in these tests show that much higher electric fields can be applied to conductive liquids and foods than have been previously used. Since the microbiological effects and attendant food preservation effects are believed to be a very strong function of the electric field applied to the liquid media, the results indicate that these effects may be enhanced significantly by using high electric field strength pulses above the values previously used.

From the previous description, it will be appreciated that systems may be designed to treat pumpable food products on a continuous basis. Design of such high voltage pulsed electric field systems may utilize some basic relationships to determine power requirements, pulser specifications and treatment cell design. FIG. 17 shows a schematic diagram of a pulsed electric field system and nomenclature used to describe various relationships. As shown, product is flowing between the pulsed electric field cell electrodes at a velocity $v_1$. The volume flow rate through the cell (cm³/s) is then given by:

$$V_1 = v_1 \, dw.$$

If the product must be treated n times as it passes through the cell, the pulser repetition frequency must be:

$$f_r = \frac{V_1 n}{V_c},$$

where
$V_c = dlw$ = treatment volume.

Another parameter required for pulser design is the cell resistance, which is given by:

$$R_c = \frac{\rho d}{wl},$$

where
$\rho$ = product resistivity.

The pulsed electric field in the cell is:

$$E_p = \frac{V_0}{d}$$

where $V_0$ is the voltage on the cell. The current is:

$$I_c = \frac{V_0}{R_c} = \frac{E_p w l}{\rho}$$

Using this, the peak power becomes:

$$P_c = I_c V_0 = \frac{E_c E_p 2}{\rho}$$

If a pulse width of $\tau_p$ is used, then the average power becomes:

$$P_{AVG} = \frac{\tau E_p 2 V_c n}{\rho}$$

The temperature rise is given by:

$$\Delta T = \frac{E^2 \tau C_p}{\rho}$$

where $C_p$ = heat capacity of the pumpable food product being treated.

For example, for a pulser designed to treat 10 liters per hour, based on impedance and voltage parameters as described hereinbelow, having cell volume of about 25 cm³ will provide approximately 9 pulses of high voltage treatment per volume as it moves through the cell.

If the flow rate is increased to slightly less than 25 cm³/s (90 l/hr) the pulser will provide approximately one treatment per pulse per cell volume.

A treatment cell, which may be a cell such as that shown in FIG. 2 or 3, may be driven by a pulse-forming network charged to some initial voltage (e.g., 50 Kv) by a conventional high voltage power source and discharged into the pulsed electric field cell. A schematic electrical diagram of a pulse forming network configuration which may be utilized is shown in FIG. 18.

Figure 20:
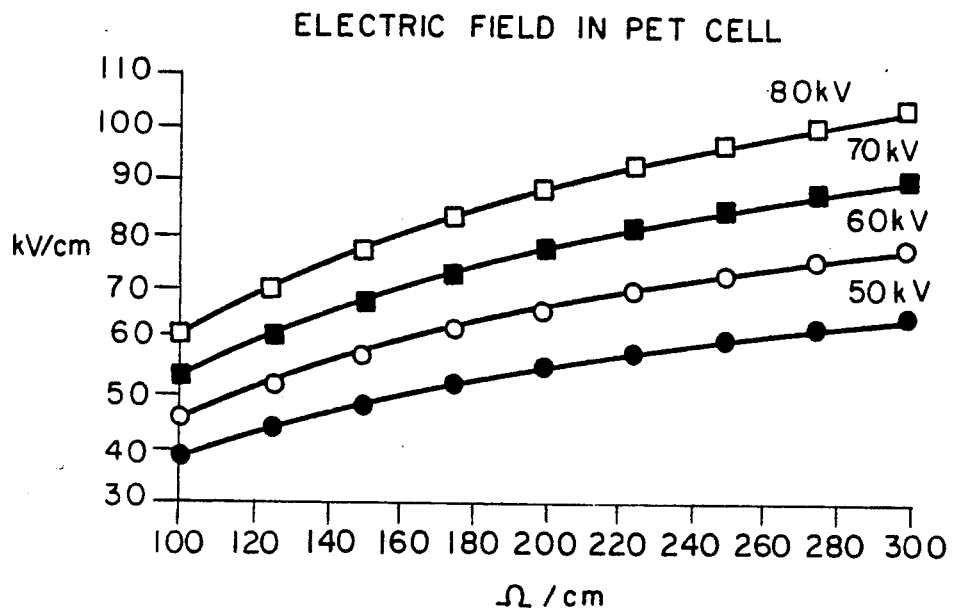
FIG. 20 is a graphic representation of the electric field produced by a pulse forming network as a function of product resistivity in a pulsed electric treatment cell.

The pulse forming network impedance should be matched to the impedance of the pulsed electric field cell to provide the highest energy transfer to the cell. The pulse forming network is 1.67Ωs and has a 20μs pulse width. The cell itself will have an impedance ranging from about 1 to 4Ω as shown in FIG. 19, depending on the resistivity of the food product used, assuming the resistivity of the food product in the range of 100 to 400Ω-cm. For a cell with 0.5 cm electrode spacing and a cell volume of 25 cm³, the pulse forming network will produce a peak electric field that depends on resistivity and charge voltage as shown in FIG. 20.

Figure 21:
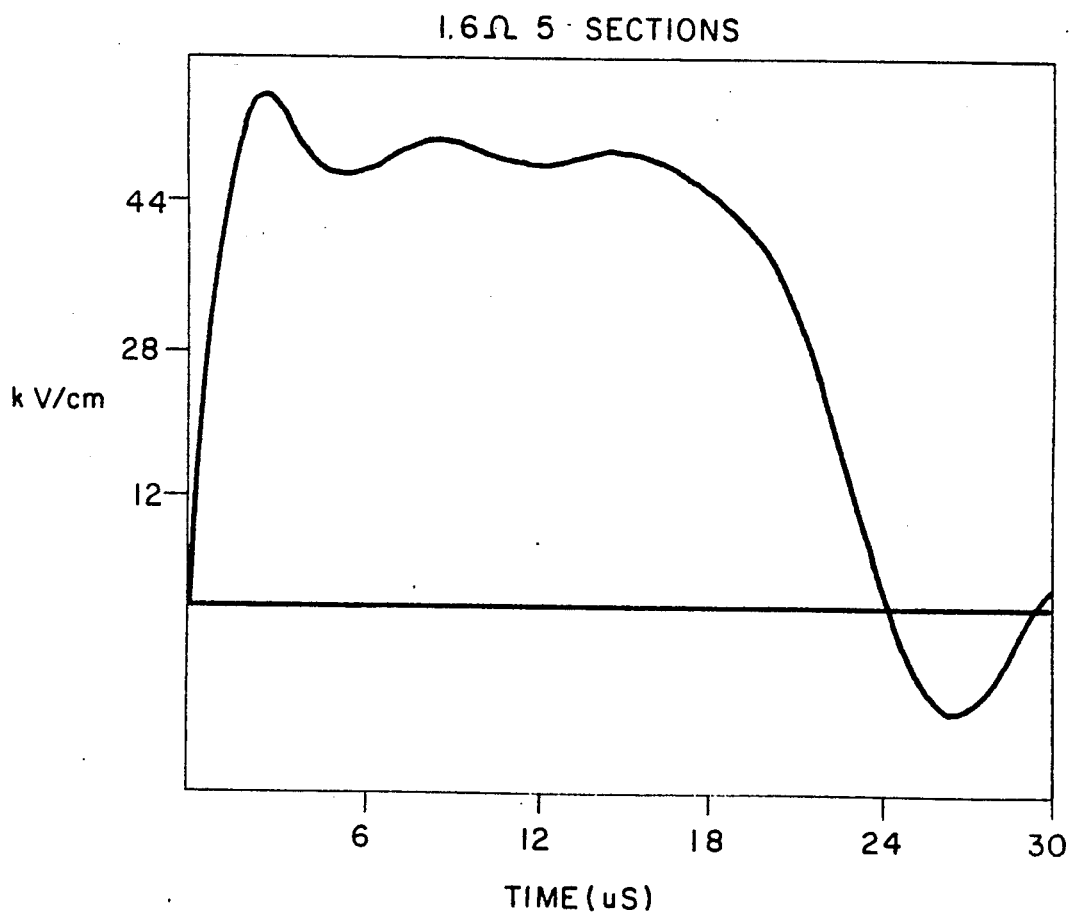
FIG. 21 is an illustration of the electric field waveform produced by a 1.0 ohm load on a 5-section pulse forming network.
Figure 22:
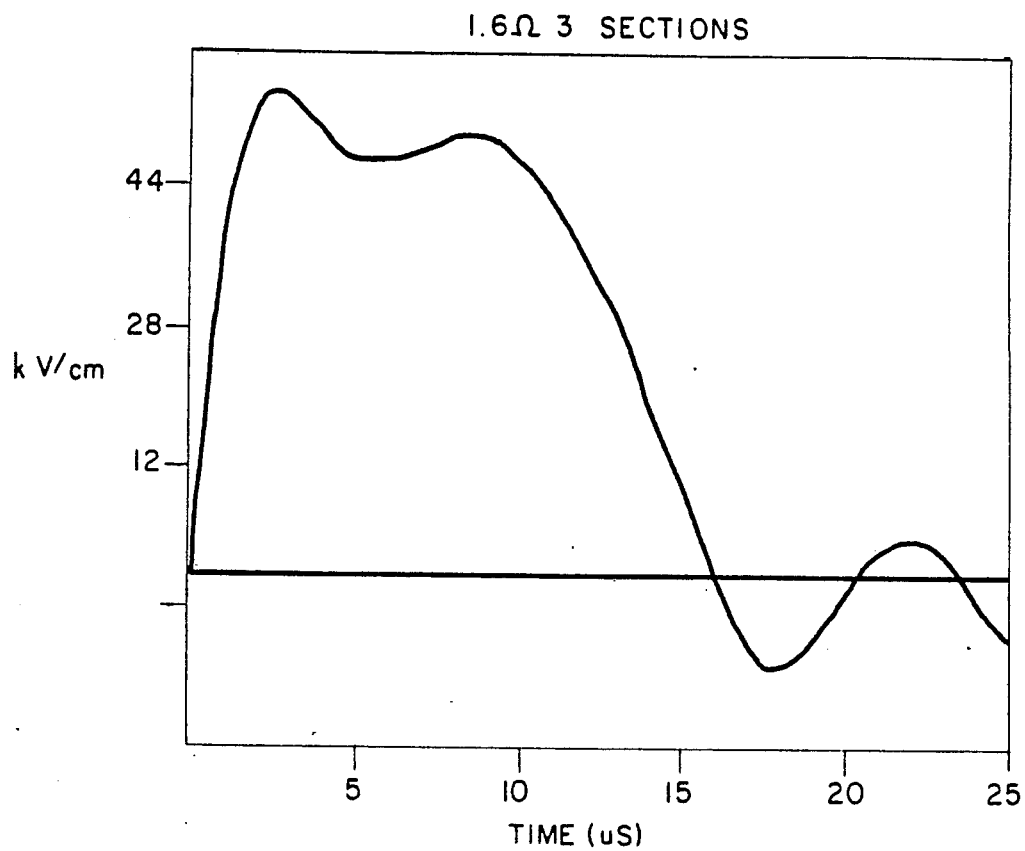
FIG. 22 is an illustration of the electric field waveform produced by a 1.6 ohm load on a 3-section pulse forming network.
Figure 23:
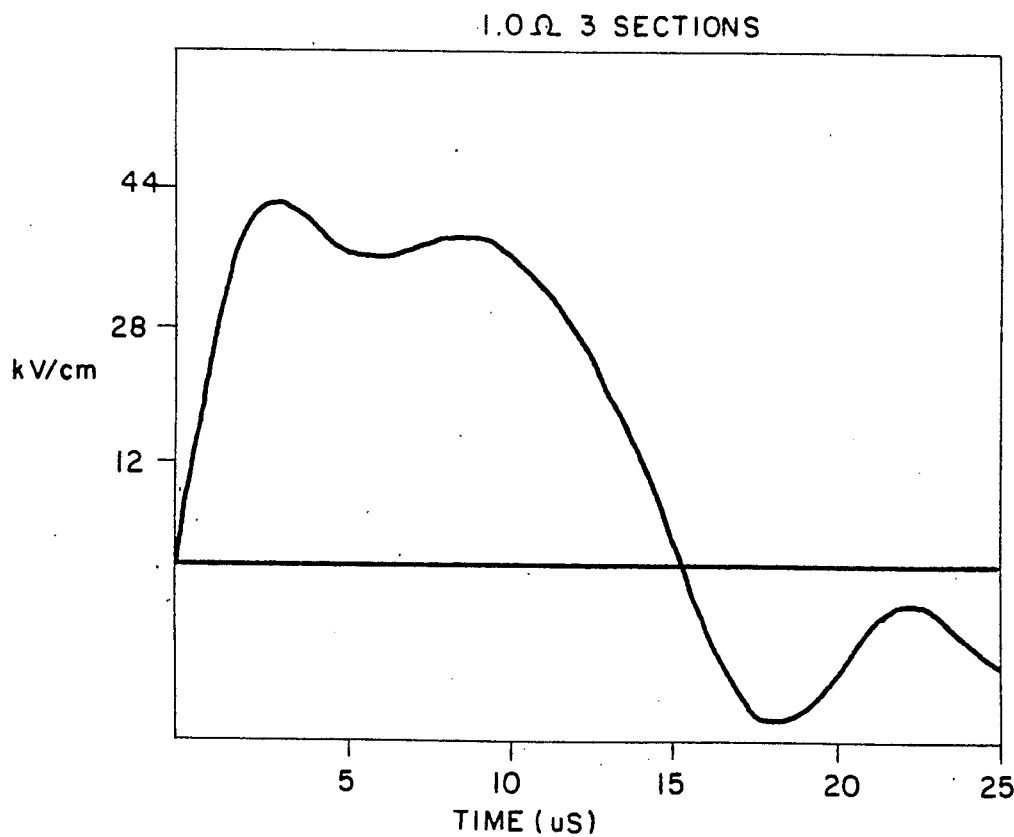
FIG. 23 is an illustration of the electric field waveform produced by a 1.0 ohm load on a 3-section pulse forming network.

The duration of the pulse produced by the pulse forming network may be varied by disconnecting sections of the pulse forming network. The illustrated pulser will be capable of producing fields as high as 90 kV/cm with a matched load. Higher levels may be achieved with higher resistivity food products. FIG. 21 shows the calculated electric field waveform with a 1.0Ω load on the cell and 20μs pulse width. FIG. 22 shows the calculated pulse shape with a 3-section pulse forming network and 1.6Ω load. FIG. 23 shows the calculated waveform for a 3-section pulse forming network and 1.0Ω load.

Food products change resistivity as a function of temperature. For example, over a temperature range of 15 to 60 degrees C., the resistivity of milk drops by a factor of about 2. The following table shows calculated temperature rises for products with various resistivities.

| Temperature Rise in Pulsed Electric Treatment Cell* | | |
|---|---|---|
| Resistivity Ω-cm | Electric Field kV/cm | Temperature Degrees C. |
| 100 | 38 | 34 |
| 200 | 54 | 35 |
| 300 | 65 | 33 |
| 400 | 71 | 30 |

*assumes $C_p = 1.0$, $t = 10$ μs, and pulse forming network charge voltage 50 kV Thus, if a typical pulse is applied to 2 percent fat homogenized milk that is initially at room temperature, the resistivity will drop from about 200 to 140 Ω-cm. This means that the electric field will also drop during the pulse. For this case, the drop would be about 15 percent.

Accordingly, it may be desirable to design a pulse forming network to correct for the drop in voltage during the pulse to optimize the pulse forming network for a particular product.

With the pulser running at 1 Hz and 50 kV charge voltage, the average power is 7.5 kW and at 80 kV, the power is 19.2 kW.

A pulsed electric field cell design suitable for continuous flow processing is shown in FIG. 3 as previously described. The illustrated cell has an active volume of 24 cm³ and an electrode gap of 0.5 cm. For 100 Ω-cm product, the cell design impedance is designed to be approximately 1Ω.

Figure 24:
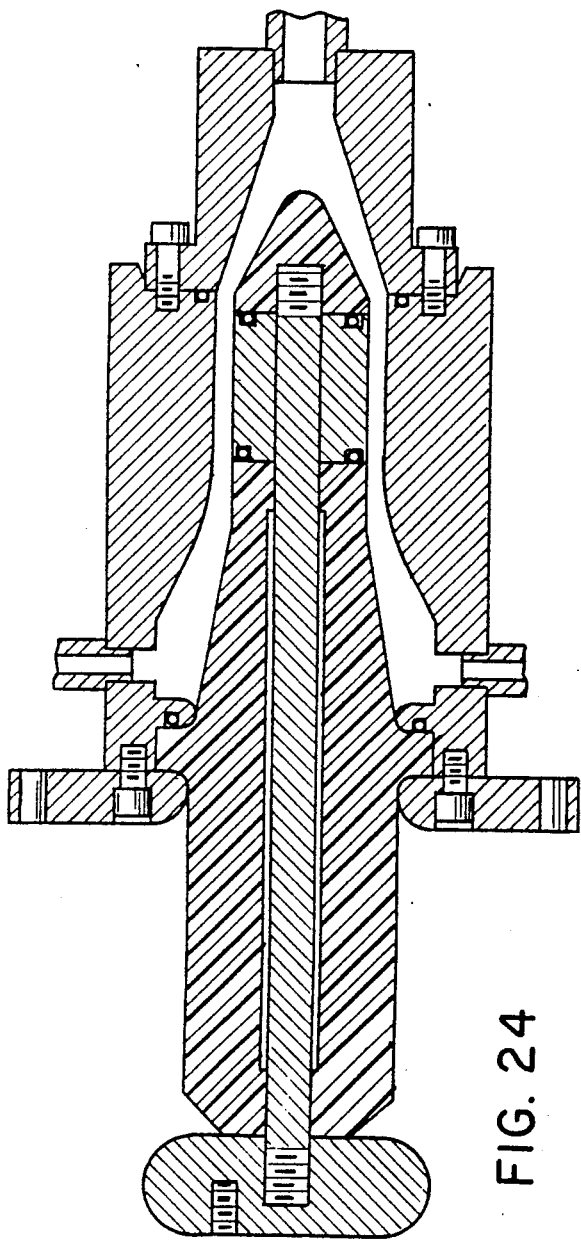
FIG. 24 is a cross sectional view through the axis of rotation of a rotationally symmetrical pulsed electric field cell similar to that of FIG. 2, configured for flow testing.

FIG. 24 shows the cell of FIG. 3 in configuration for flow testing. Product is designed to enter the cell at the bottom and flow upward past the coaxial electrodes. The flow is upward to minimize thermal mixing since the hot liquid will always be on the upper exist side of the cell. This cell design is intended to be useful for flow rates up to 100 l/hr, and possibly higher.

Figure 25:
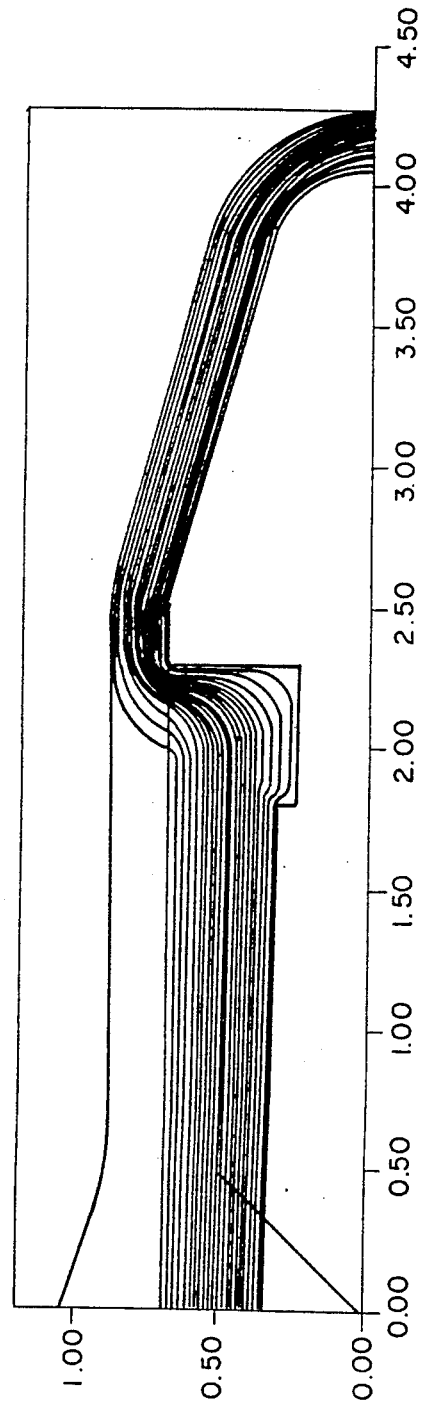
FIG. 25 is an equipotential plot of a pulsed electric field cell.
Figure 26:
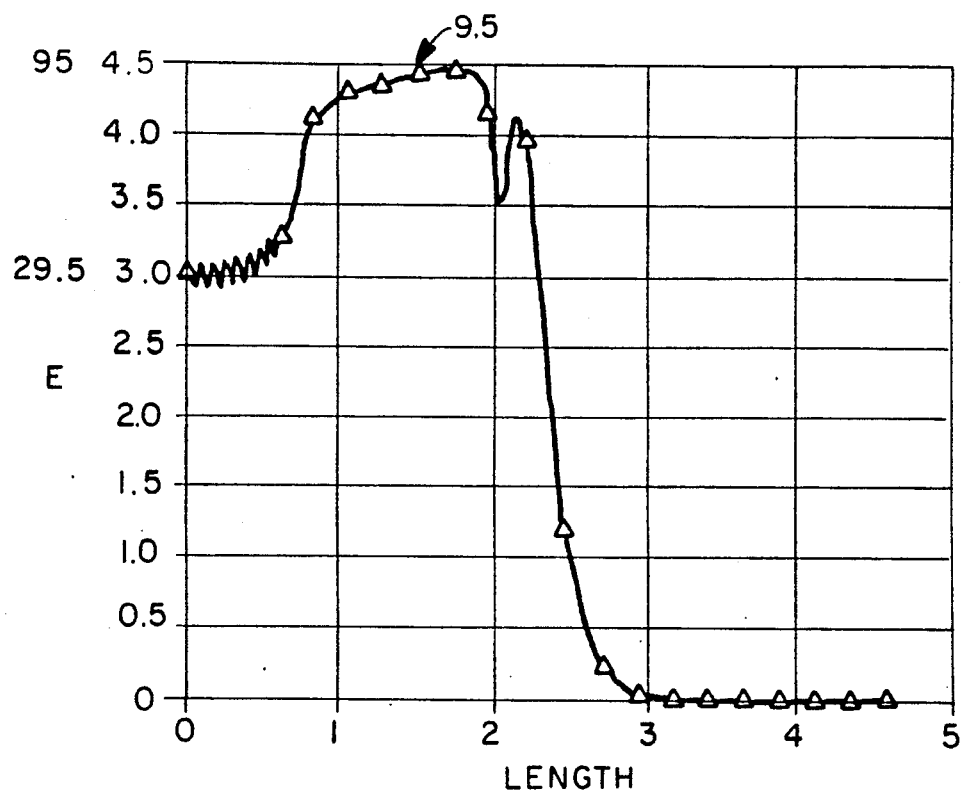
FIG. 26 is a plot of the electric field on the ground electrode of the pulsed electric field cell.
Figure 27:
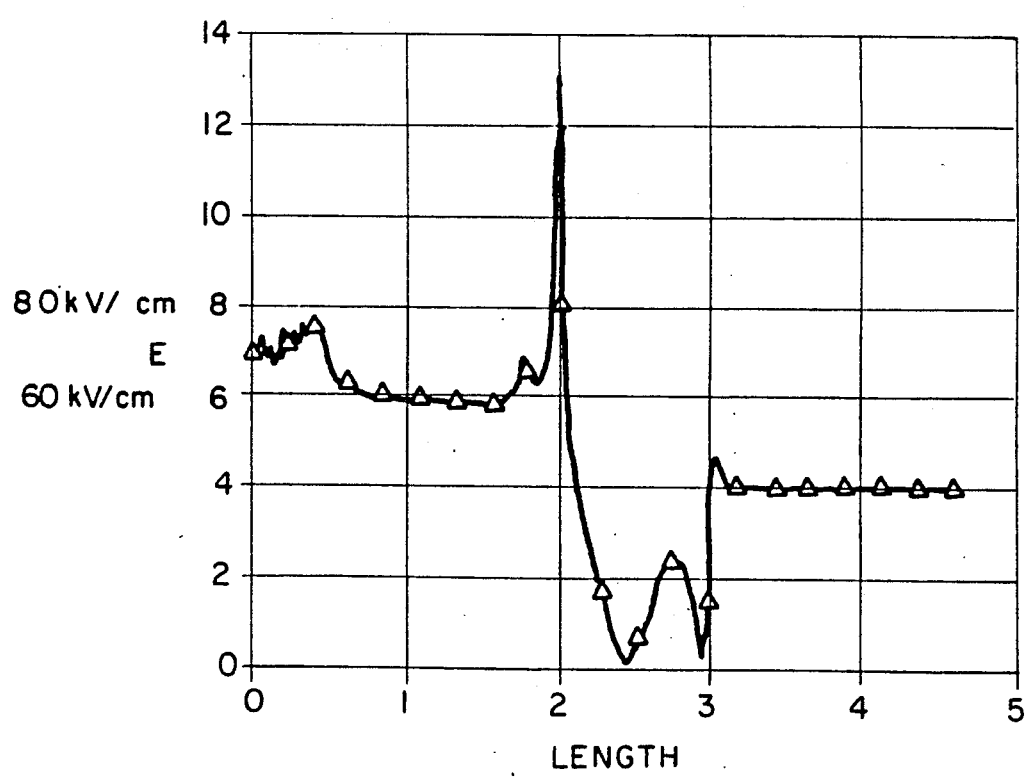
FIG. 27 is a plot of the electric field on the high voltage electrode of the pulse electric field cell.

FIG. 25 shows an equipotential plot made to determine the uniformity of the electric field produced by the cell. FIGS. 26 and 27 are plots of the electric field along the surface of the electrodes.

Accordingly, it will be appreciated that improved methods and apparatus for the preservation of fluid foodstuffs such as dairy products, fruit juices and liquid egg products have been provided in accordance with the present disclosure.

While the present invention has been particularly described with reference to specific embodiments, it will be appreciated that various modifications and adaptations will be apparent from the present disclosure which are intended to be included within the scope of the accompanying claims.

What is claimed is:

1. A pulsed field treatment apparatus for preservation treatment of a pumpable foodstuffs, comprising:
   an electric field treatment chamber comprising first electrode means for making electrical contact with the pumpable foodstuff disposed adjacent said first electrode means in said electric field treatment chamber, second electrode means spaced apart from said first electrode means for making electrical contact with the pumpable foodstuff disposed in a high voltage treatment zone between said first electrode means and said second electrode means, and sold dielectric separator means comprising a dielectric nonconductive spacer separating said first electrode means and said second electrode means externally of said electric field treatment chamber and having a minimum surface pathway length between said first electrode means, and said second electrode means of at least twice the minimum distance between said first electrode means and said second electrode means in said electric field treatment chamber;
   inlet conduit means for introducing the pumpable foodstuff to be treated into said electric field treatment chamber;
   outlet conduit means for discharging the pumpable foodstuff which has passed through said electric field treatment chamber;
   means for applying high voltage electrical pulses to said first and second electrode means at a rate of at least about 0.01 pulse per second to provide a pulsed electric field having an electric field strength of at least about 25,000 volts per centimeter between said first and second electrode means through the pumpable foodstuff located therebetween in said high voltage treatment zone; and
   means for pumping the pumpable foodstuff through said inlet conduit means at a rate such that all of the pumpable foodstuff is subjected to at least one pulse of the pulsed electric field in transit through said high voltage treatment zone before the pumpable foodstuff is conducted from the electric field treatment chamber through said outlet conduit means.

2. An apparatus in accordance with claim 1 further comprising means for heating the pumpable foodstuff to a predetermined temperature of at least about 45° C. before introduction to said electric field treatment chamber, and means for cooling the pumpable foodstuff which has passed through said one or more treatment zones to a refrigerated temperature in the range of from about 0° C. to about 10° C.

3. A pulsed electric field treatment apparatus for preservation treatment of a pumpable foodstuff, comprising:
   an electric field treatment chamber comprising first electrode means for making electrical contact with the pumpable foodstuff disposed adjacent said first electrode means in said electric field treatment chamber, second electrode means spaced apart from said first electrode means for making electrical contact with the pumpable foodstuff disposed in a high voltage treatment zone between said first electrode means and said second electrode means, and solid dielectric separator means comprising a dielectric nonconductive spacer separating said first electrode means and said second electrode means externally of said electric field treatment chamber and having a minimum surface pathway length between said first electrode means and said second electrode means of at least twice the minimum distance between said first electrode means and said second electrode means in said electric field treatment chamber;

inlet conduit means for introducing the pumpable foodstuff to be treated into said electric field treatment chamber;

outlet conduit means for discharging the pumpable foodstuff which has passed through said electric field treatment chamber;

means for applying high voltage electrical pulses to said first and second electrode means at a rate of at least about 0.01 pulse per second to provide a pulsed electric field having an electric field strength of at least about 25,000 volts per centimeter between said first and second electrode means through the pumpable foodstuff located therebetween in said high voltage treatment zone; and means for pumping the pumpable foodstuff through said inlet conduit means at a rate such that all of the pumpable foodstuff is subjected to at least one pulse of the pulsed electric field in transit through said high voltage treatment zone before the pumpable foodstuff is conducted from said electric treatment chamber through said outlet conduit means.

4. An apparatus in accordance with claim 3 further comprising means for heating the pumpable foodstuff to a predetermined temperature of at least about 45° C. before introduction to said electric field treatment chamber, and means for cooling the pumpable foodstuff which has passed through said one or more treatment zones to a refrigeration temperature in the range of from about 0° C. to about 10° C.

* * * * *

UNITED STATES PATENT AND TRADEMARK OFFICE
CERTIFICATE OF CORRECTION

PATENT NO. : 5,048,404
DATED : September 17, 1991
INVENTOR(S) : Bushnell, et al.

It is certified that error appears in the above-identified patent and that said Letters Patent is hereby corrected as shown below:

Column 2, line 15, change "Mi" to --Microorganisms III.--.

Column 3, line 53, change ",ie" to --and 8e--.

Column 24, line 15, change "sold" to --solid--.

Column 24, line 53, change "refrigerated" to --refrigeration--.

Signed and Sealed this

Thirteenth Day of April, 1993

Attest:

STEPHEN G. KUNIN

Attesting Officer

Acting Commissioner of Patents and Trademarks